(12) United States Patent
Kiyohara

(10) Patent No.: US 8,655,981 B2
(45) Date of Patent: Feb. 18, 2014

(54) INFORMATION COMMUNICATION SYSTEM, INFORMATION COMMUNICATION METHOD, AND RECORDING MEDIUM HAVING INFORMATION COMMUNICATION PROGRAM STORED THEREON

(75) Inventor: Yuji Kiyohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 494 days.

(21) Appl. No.: 12/728,612

(22) Filed: Mar. 22, 2010

(65) Prior Publication Data
US 2011/0072084 A1   Mar. 24, 2011

(30) Foreign Application Priority Data
Sep. 24, 2009   (JP) ................ 2009-219525

(51) Int. Cl.
G06F 15/16   (2006.01)
G06F 7/00   (2006.01)

(52) U.S. Cl.
USPC ............ 709/217; 709/218; 709/219; 707/715

(58) Field of Classification Search
USPC ......... 709/201, 203, 217, 218, 219, 230, 231; 370/400
See application file for complete search history.

(56) References Cited

U.S. PATENT DOCUMENTS

| | | | | |
|---|---|---|---|---|
| 6,065,058 | A * | 5/2000 | Hailpern et al. | 709/231 |
| 6,144,992 | A * | 11/2000 | Turpin et al. | 709/208 |
| 7,613,120 | B2 * | 11/2009 | Devereux et al. | 370/237 |
| 2004/0064832 | A1 | 4/2004 | Tsukidate et al. | |
| 2004/0249965 | A1 * | 12/2004 | Huggins et al. | 709/231 |
| 2005/0289237 | A1 | 12/2005 | Matsubara et al. | |
| 2006/0095532 | A1 * | 5/2006 | O'Rourke et al. | 709/213 |
| 2007/0283043 | A1 | 12/2007 | Kiyohara et al. | |
| 2008/0098088 | A1 | 4/2008 | Tamano et al. | |
| 2008/0144636 | A1 | 6/2008 | Ushiyama et al. | |

(Continued)

FOREIGN PATENT DOCUMENTS

| | | | |
|---|---|---|---|
| JP | 2004-005309 A | 1/2004 | |
| JP | 2004-127189 A | 4/2004 | |

(Continued)

OTHER PUBLICATIONS

Feb. 19, 2013 Office Action issued in Japanese Patent Application No. 2009-219525 (with translation).

*Primary Examiner* — Joseph Avellino
*Assistant Examiner* — Aftab Nasir Khan
(74) *Attorney, Agent, or Firm* — Oliff PLC

(57) ABSTRACT

An information communication system for exchanging a plurality of contents between a plurality of node devices, includes a plurality of internal networks connected to an external network. The internal networks include: the plurality of node devices connecting the same internal network; and a support device, which connects the internal networks, and which supports acquisition of contents by the node devices. An overlay network allows for exchanging of contents between the node devices and the support devices. The node devices include a first acquisition unit that acquires contents by selecting a first device group in preference to a second device group. The first device group includes: a support device and a node device connecting the internal network of an access destination that is a contents acquisition destination. The second device group includes a support device and a node device that do not connect the internal network of the access destination.

17 Claims, 19 Drawing Sheets

(56) References Cited

U.S. PATENT DOCUMENTS

| | | | |
|---|---|---|---|
| 2008/0177861 A1* | 7/2008 | Basani et al. | 709/218 |
| 2009/0106441 A1* | 4/2009 | Zuckerman et al. | 709/231 |
| 2009/0169021 A1* | 7/2009 | Ushiyama | 380/279 |
| 2010/0011052 A1* | 1/2010 | Gharabally et al. | 709/203 |
| 2011/0125870 A1* | 5/2011 | Matsumoto | 709/217 |
| 2012/0005265 A1* | 1/2012 | Ushioda et al. | 709/203 |

FOREIGN PATENT DOCUMENTS

| | | |
|---|---|---|
| JP | 2006-011693 A | 1/2006 |
| JP | A 2006-197400 | 7/2006 |
| JP | A 2007-053662 | 3/2007 |
| JP | 2009-129076 A | 6/2009 |
| WO | WO 2006-075616 A1 | 7/2006 |

\* cited by examiner

FIG. 4

| NODE ID | CONTENTS ID | BASE IDENTIFICATION INFORMATION | NODE CLASSIFICATION |
|---|---|---|---|
| SE1 | MOVIE 1 | TOKYO BRANCH | EDGE SERVER |
| SE1 | DRAMA 1 | TOKYO BRANCH | EDGE SERVER |
| T1-1 | MOVIE 1 | TOKYO BRANCH | USER TERMINAL |
| T1-2 | MOVIE 1 | TOKYO BRANCH | USER TERMINAL |
| T1-2 | DRAMA 1 | TOKYO BRANCH | USER TERMINAL |
| ⋮ | ⋮ | ⋮ | ⋮ |
| SE2 | MOVIE 2 | OSAKA BRANCH | EDGE SERVER |
| T2-1 | DRAMA 1 | OSAKA BRANCH | USER TERMINAL |
| T2-2 | DRAMA 2 | OSAKA BRANCH | USER TERMINAL |
| ⋮ | ⋮ | ⋮ | ⋮ |
| SE1 | MOVIE 1 | FUKUOKA BRANCH | EDGE SERVER |
| T3-1 | MOVIE 2 | FUKUOKA BRANCH | USER TERMINAL |
| ⋮ | ⋮ | ⋮ | ⋮ |

FIG. 5

OPERATION MODE DESIGNATING FILE

| BUSINESS SITE NAME | IP ADDRESS OF EDGE SERVER | OPERATION MODE |
|---|---|---|
| TOKYO BRANCH | 221.123.0.11 | P2P |

| NODE ID OF USER TERMINAL | OPERATION MODE |
|---|---|
| 33485445 | P2P |
| 17740248 | P2P |
| 56264009 | CLIENT-SERVER |
| 81111685 | CLIENT-SERVER |
| 39899222 | P2P |
| 73485445 | P2P |
| 97340624 | P2P |
| 27820394 | P2P |

| BUSINESS SITE NAME | IP ADDRESS OF EDGE SERVER | OPERATION MODE |
|---|---|---|
| OSAKA BRANCH | 123.214.10.124 | CLIENT-SERVER |

| NODE ID OF USER TERMINAL | OPERATION MODE |
|---|---|
| 02346892 | P2P |
| 36928945 | P2P |
| 16770048 | P2P |
| 46284109 | CLIENT-SERVER |
| 31151685 | CLIENT-SERVER |
| 59389232 | P2P |

| BUSINESS SITE NAME | IP ADDRESS OF EDGE SERVER | OPERATION MODE |
|---|---|---|
| FUKUOKA BRANCH | 222.231.0.15 | P2P |

| NODE ID OF USER TERMINAL | OPERATION MODE |
|---|---|
| 43467475 | P2P |
| 12747248 | P2P |
| 26408809 | CLIENT-SERVER |
| 41518695 | CLIENT-SERVER |
| 59090224 | P2P |

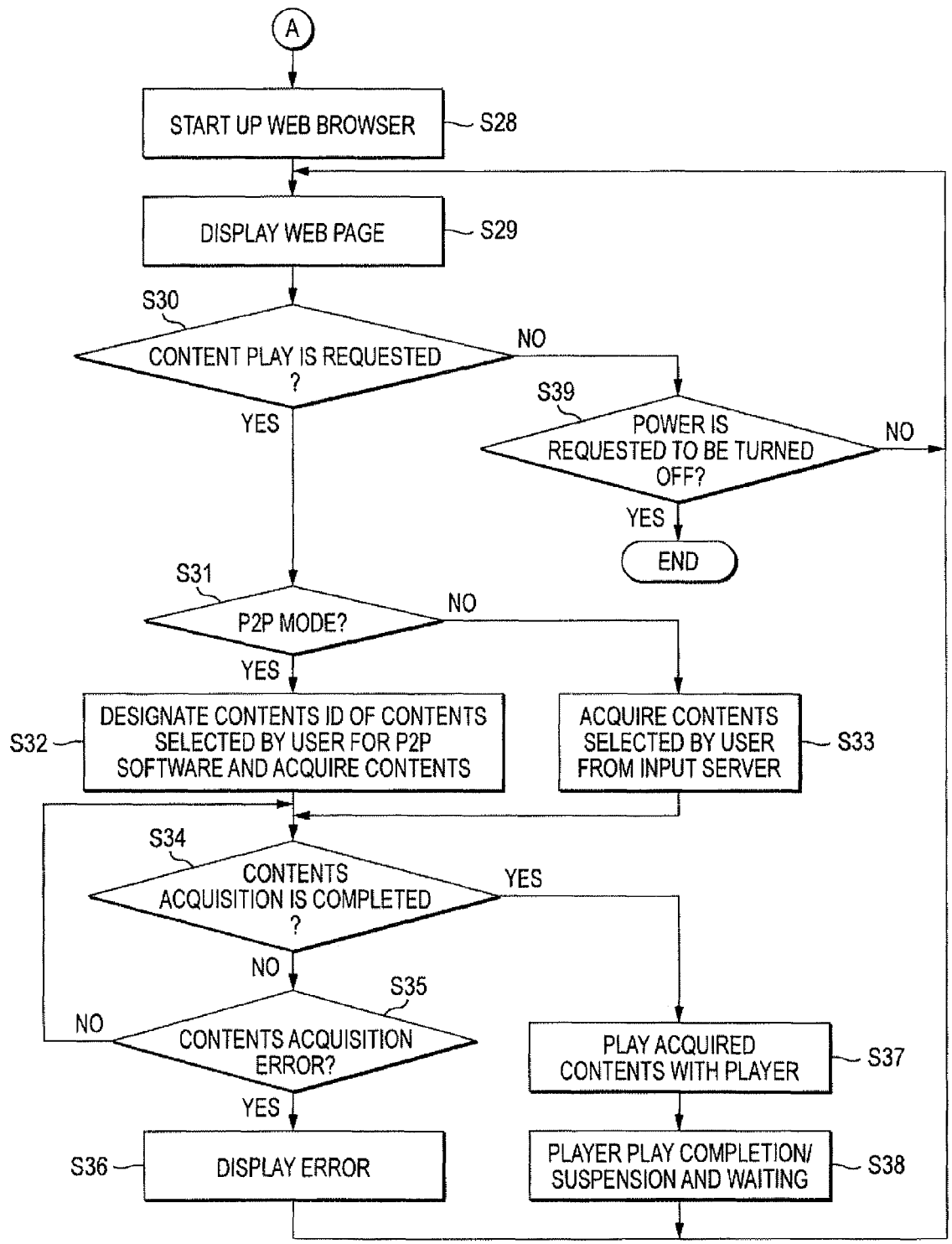

INFORMATION COMMUNICATION SYSTEM, INFORMATION COMMUNICATION METHOD, AND RECORDING MEDIUM HAVING INFORMATION COMMUNICATION PROGRAM STORED THEREON

CROSS-REFERENCE TO RELATED APPLICATIONS

This application claims priority from Japanese patent Application No. 2009-219525 filed on Sep. 24, 2009, the entire subject matter of which is incorporated herein by reference.

BACKGROUND

Technical Field

The present invention relates to a technical field of peer-to-peer (P2P) communication system including a plurality of node devices capable of communicating with each other via a network.

SUMMARY

In recent years, peer-to-peer communication systems have been in the spotlight. The peer-to-peer communication systems have been in the spotlight as a new form which takes the place of server-client system that is the current mainstream form of contents delivery. In the peer-to-peer communication system, requests for contents to a center server device are not concentrated. It is therefore possible to acquire contents in a shorter time compared to a server-client system.

In some cases such as companies, schools, hotels and the like, there may be a base at each site and a plurality of terminal devices at each of the bases. In these cases, in general, a private network such as a local area network (LAN), to which the terminal devices are connected, is formed at each base. In addition, a line connected to a public network such as the Internet or a wide area network (WAN) is provided at each base.

In these cases, it may be envisaged that each terminal device has peer-to-peer communication capability. This makes it possible for each terminal device to acquire contents from other terminal devices exist within the same base.

However, when there are a smaller number of contents stored in each terminal device exist within the base, the probability increases that necessary contents are requested from a network outside the base. In this case, for example, if there are a smaller number of externally connected lines or bandwidths of the lines are narrow, the time taken to acquire contents will be longer. Therefore, there may be cases where the peer-to-peer communication system is not able to achieve sufficient advantages.

Therefore, illustrative aspects of the present invention provide an information communication system and an information communication method, which are capable of reducing an amount of traffic on lines that access an external network from a network at a base or the like, and acquiring contents efficiently.

According to one illustrative aspect of the invention, there is provided an information communication system for exchanging a plurality of contents between a plurality of node devices, the information communication system comprising: a plurality of internal networks that is connected to an external network, wherein each of the internal networks comprises: the plurality of node devices accessing the same internal network; and a support device, which accesses the internal networks, and which supports acquisition of contents by the node devices; and an overlay network that allows for exchanging of contents between the node devices accessing the internal networks and the support devices, wherein each of the node devices comprises a first acquisition unit that acquires contents by selecting a first device group in preference to a second device group, wherein the first device group comprises: a first support device, which is a support device accessing the internal network of an access destination that is a contents acquisition destination; and a first node device, which is a node device accessing the internal network of the access destination, and wherein the second device group comprises: a second support device, which is a support device that does not access the internal network of the access destination; and a second node device, which is a node device that does not access the internal network of the access destination.

According thereto, an access destination support device and an access destination node device, both of which are contents acquisition destinations, are selected giving preference to non-access destination support devices and non-access destination node devices. Accordingly, there is a higher probability of data exchange between devices accessing the same internal network. This allows for a reduction in the amount of traffic on circuits that access an external network from the internal network, and thus the contents can be acquired efficiently.

BRIEF DESCRIPTION OF THE DRAWINGS

FIG. 4 is a view showing an example of contents that has been registered with index information;

FIG. 5 is a view showing an example of contents described in an operation mode designating file;

FIGS. 12A and 12B are flow charts each showing an exemplary process of a control unit for the user terminal according to the exemplary embodiment;

DETAILED DESCRIPTION

Exemplary embodiments of the present invention will now be described with reference to the drawings. Incidentally, in the following exemplary embodiments, the concept of the present invention is applied to a contents delivery system.

[1. Exemplary Configuration of Contents Delivery System]

First, an exemplary configuration of a contents delivery system according to the exemplary embodiment will be described with reference to FIG. 1.

Figure 1:
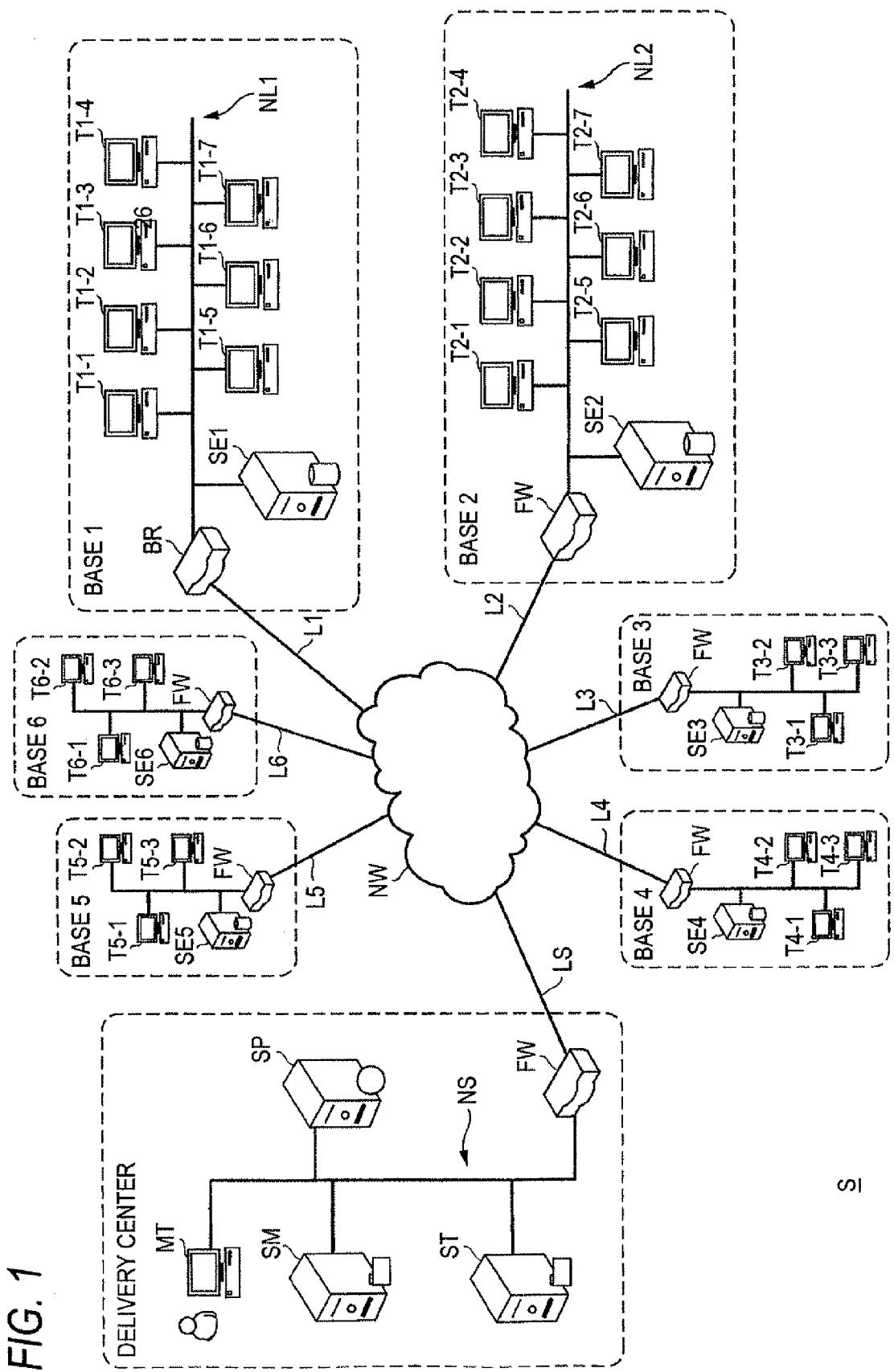
FIG. 1 is a view showing an exemplary configuration of a contents delivery system according to an exemplary embodiment of the invention.

As shown in FIG. 1, a contents delivery system S includes a delivery center network NS and a plurality of base networks NLm (m=1, 2, 3, ..., where m is a natural number) which are connected to a network NW. The network NW, the delivery center network NS and the plurality of base networks NLm constitute a practical application of a communication network. The network NW is an example of an external network. The base network NLm is an example of an internal network.

The network NW is a network which interconnects the delivery center network NS and the base networks NLm. An example of the network NW may include the Internet, a wide area network (WAN) or the like. The network NW is constructed by, for example, apparatuses of an Internet eXchange (IX), an Internet Service Provider (ISP), a Digital Subscriber Line (DSL) provider and a Fiber to the Home (FTTH) provider, and communication lines. In addition, the network NW may be a network for exclusive use by the contents delivery system S.

The delivery center network NS is a network constructed within a site of a delivery center. All of apparatuses constituting the delivery center network NS do not need to be constructed within the same site. The delivery center network NS may be constructed by, for example, a local area network (LAN) or the like.

In addition, the delivery center network NS is connected with server devices such as an input server ST, a management server SM, a portal server SP and the like, a management terminal MT, and the like. Further, the delivery center network NS is connected with a firewall FW which interconnects the delivery center network NS and the network NW via a communication line LS.

Each base network NLm is a network constructed within a site of each base m. An example of the base may include a company, a school, a hospital, an educational institute or the like. The base network NLm is constructed by, for example, a LAN or the like. Alternatively, the base network NLm may be a network constructed by interconnecting a plurality of LANs. In this case, the plurality of LANs is interconnected via a network apparatus such as a router or the like. An example of the network with the plurality of LANs interconnected may include a Campus Area Network (CAN) or the like.

In addition, each base network NLm is connected with a plurality of user terminals Tm-n (n=1, 2, 3, ..., where n is a natural number) (one example of a node device) and an edge server SEm (one example of a support device). Further, each base network is connected with a firewall FW or a broadband router BR which interconnects the delivery center network NS and the network NW via a communication line Lm. Which out of the fire wall FW or the broadband router BR is provided in each base is arbitrarily determined for each base.

The input server ST is a server device which inputs contents data in a P2P network PW (which will be described later). As used herein, the input of contents data refers to putting contents data into a condition where the contents data can be acquired from the edge server SEm. The contents data may simply be called "contents."

The portal server SP transmits a Web page to the user terminal Tm-n according to a request from the user terminal Tm-n. The Web page transmitted by the portal server SP constitutes a Web site which delivers moving picture data as an example of the contents.

The management server SM provides a Web application, which manages the delivered contents, to the management terminal MT. That is, the management server SM transmits the Web page, which manages the contents, to the management terminal MT. In addition, the management server SM provides a Web application, which sets operation modes of each edge server SEm and each user terminal Tm-n, to the management terminal MT. Details of the operation modes will be described later.

The user terminal Tm-n is a terminal device used by a user at the base m. The user terminal Tm-n acquires a Web page from a Web server such as the portal server SP or the like and displays the acquired Web page on a screen. In addition, the user terminal Tm-n acquires and stores contents from a different terminal Tm-n or edge server SEm connected to the same base m. In addition, the user terminal Tm-n reproduces contents such as moving picture data or the like.

Each base m is provided with at least one edge server SEm. The edge server SEm supports the acquisition of contents by the terminal Tm-n connected to the same base m. Specifically, on behalf of the user terminal Tm-n, the edge server SEm acquires the contents from a different edge server SEm or input server ST. Then, the edge server SEm transmits the acquired contents to the user terminal Tm-n. In addition, the edge server SEm stores the acquired contents.

[2. Outline of Peer-to-Peer Network]

Next, an outline of a peer-to-peer network in the contents delivery system S will be described with reference to FIG. 2.

A peer-to-peer network for contents delivery is constructed in the contents delivery system S. The peer-to-peer network is called a "P2P network PW."

Figure 2:
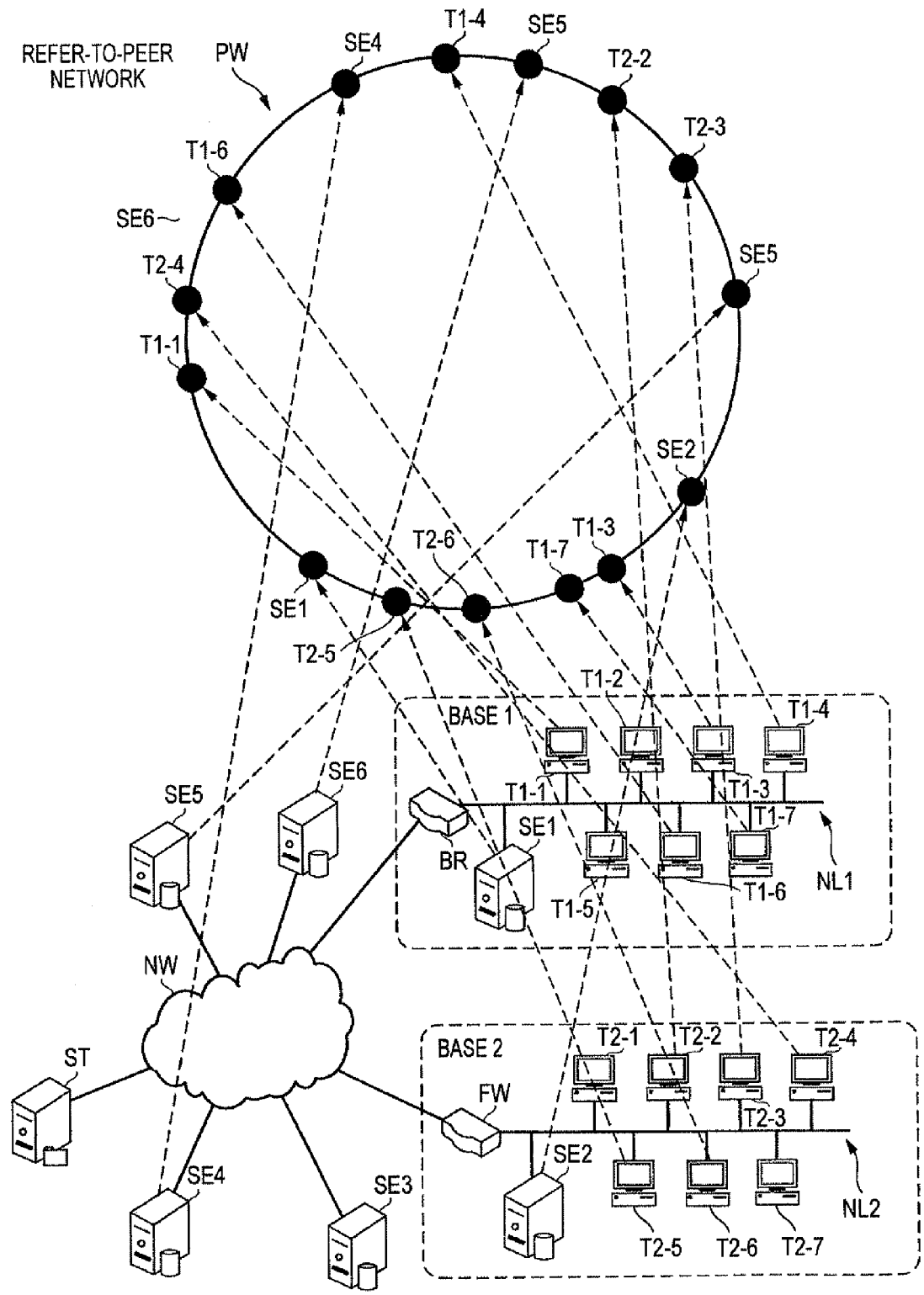
FIG. 2 is a view showing an exemplary construction of a P2P network in the contents delivery system according to the exemplary embodiment.

As shown in FIG. 2, the P2P network PW is a logical overlay network constructed on a network formed by the network NW and a plurality of base networks NLm. The P2P network PW is a network formed by connection of a plurality of user terminals Tm-n and edge servers SEm constituting the content delivery system S. In addition, the P2P network PW may be connected with the input server ST. Each base network NLm is connected to the network NW via the broadband router BR or the firewall FW. Accordingly, it is necessary to perform a port forwarding setting for the broadband router BR or the firewall FW so that the user terminal Tm-n and the edge server SEm can conduct peer-to-peer communication. For example, for the broadband router BR, the port forwarding setting may be automatically performed using a Universal Plug and Play (UPnP) function or the like.

In the following description, a device connected to the P2P network PW is called a "node." A device corresponding to this node is the user terminal Tm-n and the edge server SEm. Alternatively, a set of the user terminal Tm-n, the edge server SEm and the input server ST may correspond to a node. The P2P network PW is implemented by a particular algorithm, for example, an algorithm using a Distributed Hash Table (DHT). Each node connected to the contents delivery system S is assigned a node ID that is unique identification information consisting of a predetermined number of digits.

For example, the node ID is a value obtained by hashing an IP address, a serial number, a Media Access Control (MAC) address or the like, which is assigned individually to each node, using a common hash function. Node IDs are arranged in an ID space in a distributed manner without any bias. An example of the hash function may include SHA-1 or the like. For example, a hashed value may have a bit length of 160 bits. The node IDs are arranged in an ID space in a distributed manner without any bias. The node IDs may be registered for each node by a system administrator, a user or the like when P2P software for connection to the peer-to-peer networks is set up. The P2P network PW and each base P2P network PLm shown in FIG. 2 have a ring-like ID space for the node Ms. A position of each node shown in the ring-like ID space of FIG. 2 corresponds to its respective node ID.

The connection to the P2P network PW is performed when a node, which is not connected to the P2P network, transmits a participation request message, which indicates a request for participation in the contents delivery system, to any connected node. The participation request message is one example of participation request information. Here, the participation in the P2P network PW refers to a condition where a node connected to the P2P network PW can acquire contents from the P2P network PW. Any node is a contact node that is always connected to, for example, the P2P network PW. For the P2P network PW, the contact node is, for example, the input server ST.

Each node maintains its respective routing table using DHT. The routing table specifies a transmission destination of various messages on the contents delivery system S. More specifically, a variety of node information indicating addresses and the like of nodes spaced appropriately from each other in the ID space is registered in the routing table. The node information (one example of address information) includes a node ID, an IP address and a port number of a node.

One node connected to the P2P network PW stores the required minimum of node information as the routing table. When various messages are exchanged between different nodes, node information is acquired on nodes for which there is no node information stored.

Such a routing table using DHT is disclosed in JP-A-2006-197400, and therefore detailed explanation thereof will be omitted.

The P2P network PW distributes and stores replicas of various types of contents in a specific file format over a plurality of nodes. The replica can be utilized between the nodes. The original copies of the contents are stored in the input server ST. For example, a replica of movie contents with a title "XXX" is stored in a contents cache area of an edge server SE5. As another example, a replica of movie contents with a title "YYY" is stored in a contents cache area of an edge server SE3. In this manner, the contents are distributed and stored over the plurality of nodes. As used herein, the contents cache area refers to an area in which contents are stored and maintained. An actual contents cache area is assigned to, for example, a particular hard disk included in a node or a particular partition of the hard disk. A storage capacity of the contents cache area of the edge server SEm is larger than that of a contents cache area of the user terminal Tm-n. As one example, the storage capacity of the contents cache area of the edge server SEm is 10 to 100 times of the storage capacity of the contents cache area of the user terminal Tm-n. When all contents cannot be stored in the contents cache area, the old contents are deleted from the content cache area, for example, with the oldest contents deleted first, in order to keep the newer contents. The age of contents may be determined based on, for example, the use date of the contents and the like. Hereinafter, a node that stores a replica of contents is referred to as a "content retention node." In addition, in the following description, the original copy and replica of contents are simply called "contents" without making a distinction between them.

The above-mentioned contents are added with information such as contents name, contents ID that is unique identification information and the like. The contents ID is generated by hashing "contents name+random numerical value" using the common hash function that is also used to obtained the node ID. Alternatively, a system administrator may assign a unique contents ID value to each contents.

The location of the contents, which are distributed and stored, is stored by nodes or the like which manage (store) the location of the contents as index information. Hereinafter, a node that manages (stores) the location of the contents is called a "root node." The index information includes a set of node information of a node, which stores the contents, and a content ID of the contents and the like. Such a root node is determined to be a node having, for example, a node ID closest to the contents ID. The node ID closest to the contents ID is, for example, a node ID having digits which most match the first digits of the contents ID.

For example, the index information on movie contents with a title "XXX" is managed by a user terminal T3-1 that is a root node of the contents.

If a user of a node wishes to acquire desired contents, the node that intends to acquire the contents generates a message. Hereinafter, a node that intends to acquire contents by a user is called a "user node." This message is a contents location inquiry message including a contents ID of contents to be acquired, an IP address and port number of a user node and the like. The contents location inquiry message is a message for searching a content retention node. The above-mentioned contents location inquiry message is sent to different nodes according to a routing table of DHT acquired by the user node. That is, the user node sends the contents location inquiry message toward the root node. This allows the contents location inquiry message to finally reach the root node by DHT routing with a contents ID as a key.

For each node, attribute information such as the contents ID of the contents or the like is described in the contents catalog information. An example of the contents attribute information described in the contents catalog information may include a contents name, a contents ID, publication starting and ending dates of contents, a valid/invalid flag and the like. The valid/invalid flag is a flag indicating whether contents are valid or invalid. If the valid/invalid flag indicates that the contents are invalid, the contents have been deleted from a contents cache area.

The contents catalog information is delivered from, for example, the input server ST to all the nodes. Such delivery of the contents catalog information may be performed by, for example, a DHT multicast (multicast message transmission process), which is disclosed in JP-A-2007-053662. Alternatively, the contents catalog information may be acquired by periodic access by each node to the input server ST.

The DHT routing is disclosed in JP-A-2006-197400 and the like. Therefore, detailed explanation thereof will be omitted.

The root node, which received the contents location inquiry message, acquires the index information corresponding to the contents ID included in the message from an index information cache. The acquired index information is included in a contents location inquiry response message that is returned to the user node that is the transmission source of the contents location inquiry message. This contents location inquiry response message is a message that responds to the contents location inquiry message. The user node that acquired the index information thus can download (acquire) contents based on the index information. Based on an IP address, a port number and the like of a contents retention node included in the index information, the user node accesses the contents retention node. The user node may download contents from the accessed contents retention node. In addition, in some cases, node information of a plurality of contents retention nodes may be included in the index information. In these cases, the user node selects one from the plurality of contents retention nodes. Then, the user node may access the selected contents retention node to download contents therefrom.

In addition, the root node may transmit a contents transmission request message to a contents retention node indicated by the IP address, port number and the like included in this index information. This allows a user node to download the contents from the contents retention node. In addition, the user node may acquire this index information from a cache node, which caches the same index information as the root node, until the contents location inquiry message manages to reach the root node.

When the user node acquires and stores the contents from the contents retention node, the user node generates a publish message. The publish message is a message for informing the root node of the storing of the content. The publish message includes contents ID of the contents, and node information of a node device that stores the contents. The publish message is sent toward the root node. This allows the publish message to reach the root node by the DHT routing with the contents ID as a key, like the contents location inquiry message. Then, the root node receives the publish message. The root node stores the index information, which includes a set of node information and contents ID included in the publish message, in an index information cache area. Thus, the user node becomes a new contents retention node that retains the contents.

[3. Outline of Contents Delivery]

Next, the outline of operation of the contents delivery system S for contents delivery will be described with reference to FIGS. 3 and 4.

Figure 3:
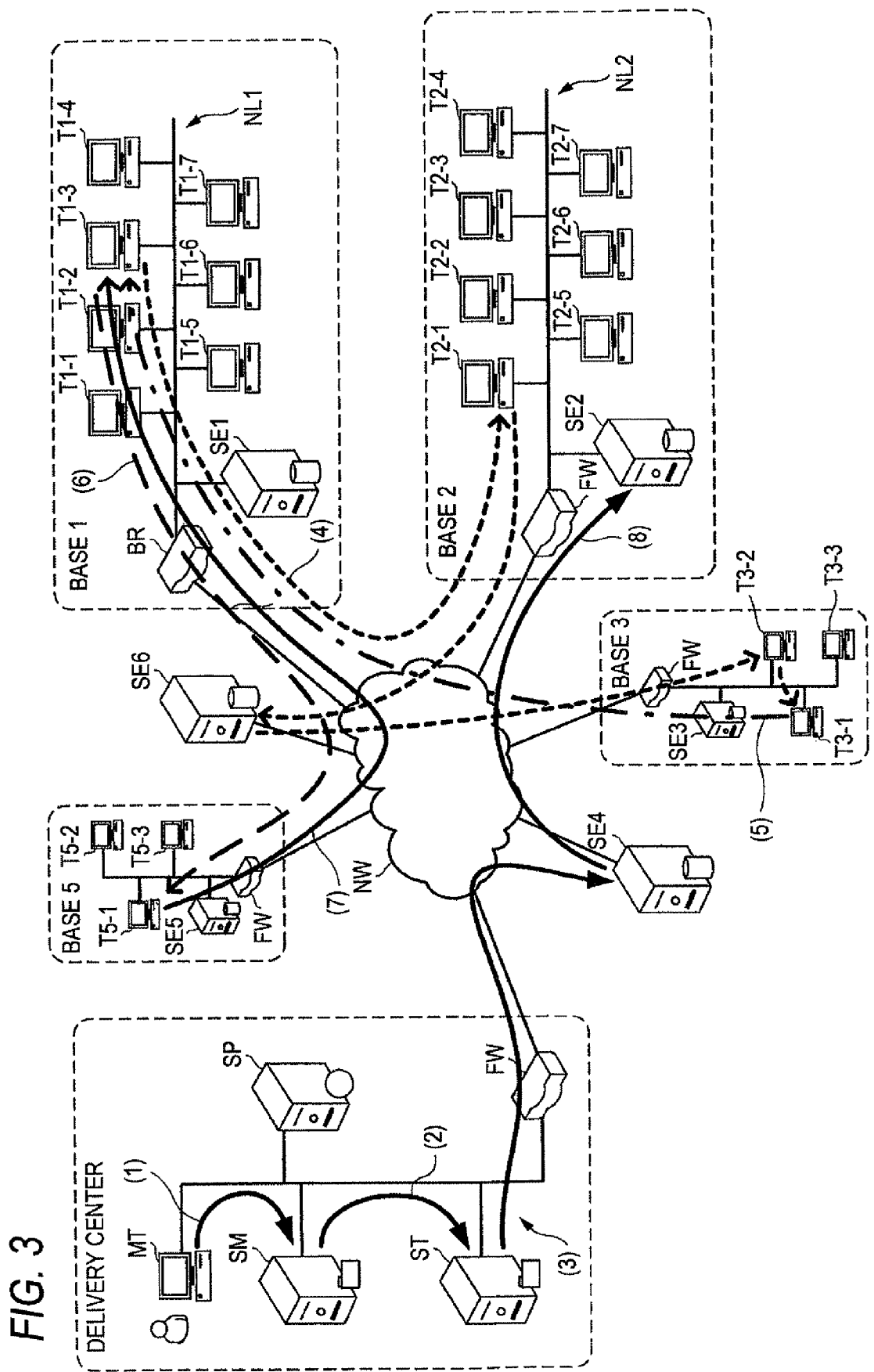
FIG. 3 is a conceptual view showing an example of contents delivery in the contents delivery system according to the exemplary embodiment.

First, a system administrator operates the management terminal MT to register contents for delivery (FIG. 3(1)). More specifically, the system administrator designates a file name and a contents name of the contents on a Web application. Then, the management terminal MT transmits the contents designated with the file name to the management server SM.

The management server SM transmits the received contents to the input server ST and instructs the input server ST to deliver the contents (FIG. 3(2)). The input server ST assigns and stores the received contents with a new content ID. In addition, the input server ST responds to the management server SM with the contents ID assigned to the contents. Upon receiving the contents ID, the management server SM updates a Web page delivered from the portal server SP. More specifically, the management server SM adds a tag, which describes the assigned contents ID and the contents name, to a Hyper Text Markup Language (HTML) document constituting the Web page. This allows new contents to be selected as reproducible contents.

The input server ST inputs the contents, which are received from the management server SM, into the P2P network PW (FIG. 3(3)). More specifically, the input server ST transmits the contents to one or more edge servers SEm and user terminals Tm-n. In addition, the input server ST delivers the contents catalog information with the attribute information of the registered contents added to each edge server SEm and each user terminal Tm-n. Alternatively, the input server ST may store the contents for itself without transmitting the contents at this point. Even in this case, the contents can be acquired from the input server ST when needed by the edge server SEm and the user terminal Tm-n.

Thereafter, when any user terminal Tm-n, for example, a user terminal T1-3, accesses the portal server SP, the user terminal Tm-n receives and displays a Web page on its own screen. Then, a user instructs the user terminal to reproduce certain contents, for example, contents A, on the Web page displayed on the screen. Then, the user terminal T1-3 attempts to acquire the contents A from the P2P network PW. More specifically, the user terminal T1-3 transmits a contents location inquiry toward a root node of the contents A that is participating in the P2P network PW (FIG. 3(4)). This contents location inquiry is forwarded to a user terminal T3-1, which is a root node, via, for example, a user terminal T2-1, an edge server SE6 and a user terminal T3-3.

The user terminal T3-1 transmits the index information of the contents A to the user terminal T1-3 (FIG. 3(5)). The user terminal T1-3 transmits a contents request message to one of the contents retention nodes with the node information included in the received index information, for example, a user terminal T5-1 (FIG. 3(6)). The user terminal T5-1 transmits the contents A stored in a contents cache area of the user terminal T5-1 itself to the user terminal T1-3 (FIG. 3(7)). Then, the user terminal T1-3 starts to reproduce the received contents. In addition, even in a case where the edge server SEm attempts to acquire contents, the contents may be acquired in the same manner as in FIGS. 3(4) to 3(7).

[4. Priority in terms of Destination of Contents Acquisition]

As described above, the user terminal Tm-n may acquire contents from any user terminal Tm-n and edge server SEm that participates in the P2P network PW. However, when contents are acquired from a user terminal Tm-n or an edge server SEm that access a base network NLm other than the base network NLm accessed by the user terminal Tm-n itself, traffic on the communication circuit Lm increases.

So, for the contents delivery system S, contents priorities are provided. Details of the priorities are as follows.

First rank: user terminal Tm-n in the same base
Second rank: edge server SEm in the same base
Third rank: edge server SEm in another base
Fourth rank: user terminal Tm-n in another base
Fifth rank: input server ST As shown herein, the user terminal Tm-n in the same base or the edge server SEm in the same base refer respectively to an user terminal Tm-n and an edge server SEm that access the base network NLm accessed by the user terminal Tm-n that acquires contents. The user terminal Tm-n in another base or the edge server SEm in another base refer respectively to an user terminal Tm-n and an edge server SEm that access a base network NLm other than the base network NLm accessed by the user terminal Tm-n that acquires contents.

Priorities of the user terminal Tm-n and edge server SEm in the same base are set to be higher than those of the user terminal Tm-n and edge server SEm in another base. The reason for this is a reduction of traffic on the communication circuit Lm. Accordingly, there is an increased probability of contents exchange between devices that access the same base network NLm. This allows for a reduction of traffic on the communication circuit Lm that is connected from the base network NLm to the network NW, which results in efficient acquisition of contents.

The priority of the user terminal Tm-n in the same base is set to be higher than that of the edge server SEm in the same base. In a contents cache area of the edge server SEm are stored contents having the highest possibility of being downloaded by the user terminal Tm-n, as will be described below. In addition, the storage capacity of the contents cache area of the edge server SEm is set to be higher than that of a contents cache area of the user terminal Tm-n. From this, the edge server SEm is more likely to request contents than the user terminal Tm-n. Accordingly, the above-mentioned priorities are provided to reduce a load of the edge server SEm. Accordingly, if required contents are stored in both the user terminal Tm-n in the same base and the edge server SEm in the same base, the contents are acquired from the user terminal Tm-n in the same base. This allows for a reduction in a load of the edge server SEm that has a higher probability of request for contents than the user terminal Tm-n.

The priority of the edge server SEm in another base is set to be higher than that of the user terminal Tm-n in another base. Depending on the base m, the base network NLm may be constructed with a plurality of networks being connected via a network device such as a router or the like. In this case, if a user terminal Tm-n as a contents retention node is connected to a network that is far in network terms from the network NW, contents transmitted from the user terminal Tm-n pass through a plurality of network devices. Thus, a load is imposed on these network devices and contents acquisition efficiency is lowered. Accordingly, the above-mentioned priorities are provided to reduce the load of the network devices. It is here assumed that the base network NLm is constituted by relay devices such as a plurality of routers or the like. In this case, the edge server SEm or the user terminal Tm-n belonging to the base network NLm may include a device that accesses the network NW via a relay device and a device that accesses the network NW via no relay device. In this case, a load of the relay device can be reduced when the edge server SEm accesses the network NW via no network device. Alternatively, the edge server SEm may be connected to a network that is relatively close in network terms to the network NW, of a plurality of devices that accesses the base network NLm. The term "close in network terms" means there is a lower number of relay devices that relay the connection of the edge server SEm to the network NW. In addition, a network distance from the network NW to a network accessed by a device means the number of networks or network devices through which data pass until the data arrive from the network NW at the network accessed by the device. The fewer number of network devices through which data pass means a smaller distance from the network NW.

The input server ST has the lowest priority. The reason for this is that it is necessary to minimize a load of the input server ST since the input server ST is an originator of all contents.

In order to acquire contents based on the priorities as set above, when a node storing the contents transmits a publish message, base identification information and node classification type of the base m to which the node belongs are included in the publish message. The base identification information is identification information of the base m. The node classification information indicates whether a contents retention node is the user terminal Tm-n or the edge server SEm. A root node that receives the publish message stores index information that is a set of node information of the contents retention mode, a contents ID of the stored contents, the base identification information and node classification information of the contents retention node, and the like, which are included in the publish message. Upon receiving a contents location inquiry message, the root node transmits the index information including the base identification information and node classification information to a user node. Then, the user node determines the contents retention node to be a contents acquisition destination based on the base identification information and node classification information included in the index information transmitted from the root node.

The index information shown in FIG. 4 is an amalgamation of index information of various contents. The node information column of FIG. 4 is presented with codes of the edge server SEm or the user terminal Tm-n as a contents retention node, on behalf of the node information. The contents ID column of FIG. 4 is presented with contents names on behalf of the contents ID. The base identification information column of FIG. 4 is presented with business site names as an example of the base identification information.

As shown in FIG. 4, for example, contents with a content title "movie 1" are stored in an edge server SE1, a user terminal T1-1, a user terminal T1-2 and an edge server SE3. In this case, a user terminal T1-3 as a user node acquires the contents "movie 1" from the user terminal T1-1 or the user terminal T1-2 with the highest ranking priority. In addition, a user terminal T3-1 as a user node acquires the contents "movie 1 from the edge server SE3 with the second ranking priority. In addition, a user terminal T2-1 as a user node acquires the contents "movie 1 from the edge server SE1 or the edge server SE3 with the third ranking priority. As another example, contents with a content title "drama 2" are stored in a user terminal T2-2. In this case, the user terminal T1-1 as a user node acquires the contents "drama 2" from the user terminal T2-2 with the fourth ranking priority. Contents with a contents name "movie 3" are not store in any nodes. In this case, a user node acquires the contents "movie 3 from the input server ST with the fifth ranking priority.

[5. Pre-Acquisition of Contents by Edge Server]

As described above, the user terminal Tm-n and the edge server SEm in the same base are selected as contents acquisition destinations in preference to the user terminal Tm-n and edge server SEm in another base. However, such preferential selection is achieved under the presumption that user terminal Tm-n or the edge server SEm in the same base is storing the required contents.

Therefore, the edge server SEm pre-acquires contents, which are highly likely to be downloaded by the user terminal Tm-n, from the P2P network PW (FIG. 3(8)). Thus, the edge server SEm in the same base can be easily selected as a contents acquisition destination. This allows for a reduction in traffic on the communication circuit Lm. In addition, even when the edge server SEm acquires contents, a contents acquisition destination is selected with the same priority as the user terminal Tm-n. Accordingly, contents, which are highly likely to be acquired by the user terminal Tm-n, are more likely to be stored by the edge server SEm in the same base, even though the contents have been not stored by the user terminal Tm-n in the same base. Accordingly, there is an increased probability of contents exchange between devices that access the same base network NLm. This allows for a reduction in traffic on the communication circuit Lm that is connected from base network NLm to the network NW, which results in efficient acquisition of contents.

There are various conditions that determine whether or not there is a high probability that contents will be downloaded. For example, newly-arrived contents may be a condition of contents that are highly likely to be downloaded. This is because the newly-arrived contents are more likely to be acquired by more user terminals Tm-n in a short time than any other contents. Alternatively, contents downloaded by more than a predetermined number of times over a predetermined period of time may be a condition of contents that are highly likely to be downloaded.

This uses contents popularity to determine a probability of contents being downloaded. As another alternative, a system administrator or the like may make a pre-determination on a degree of probability of contents being downloaded and add information indicating the degree of probability of contents being downloaded to contents catalog information. By doing so, the edge server SEm can determine contents with a high possibility of contents being downloaded based on the contents catalog information.

[6. Switch of Operation Mode]

Figure 6:
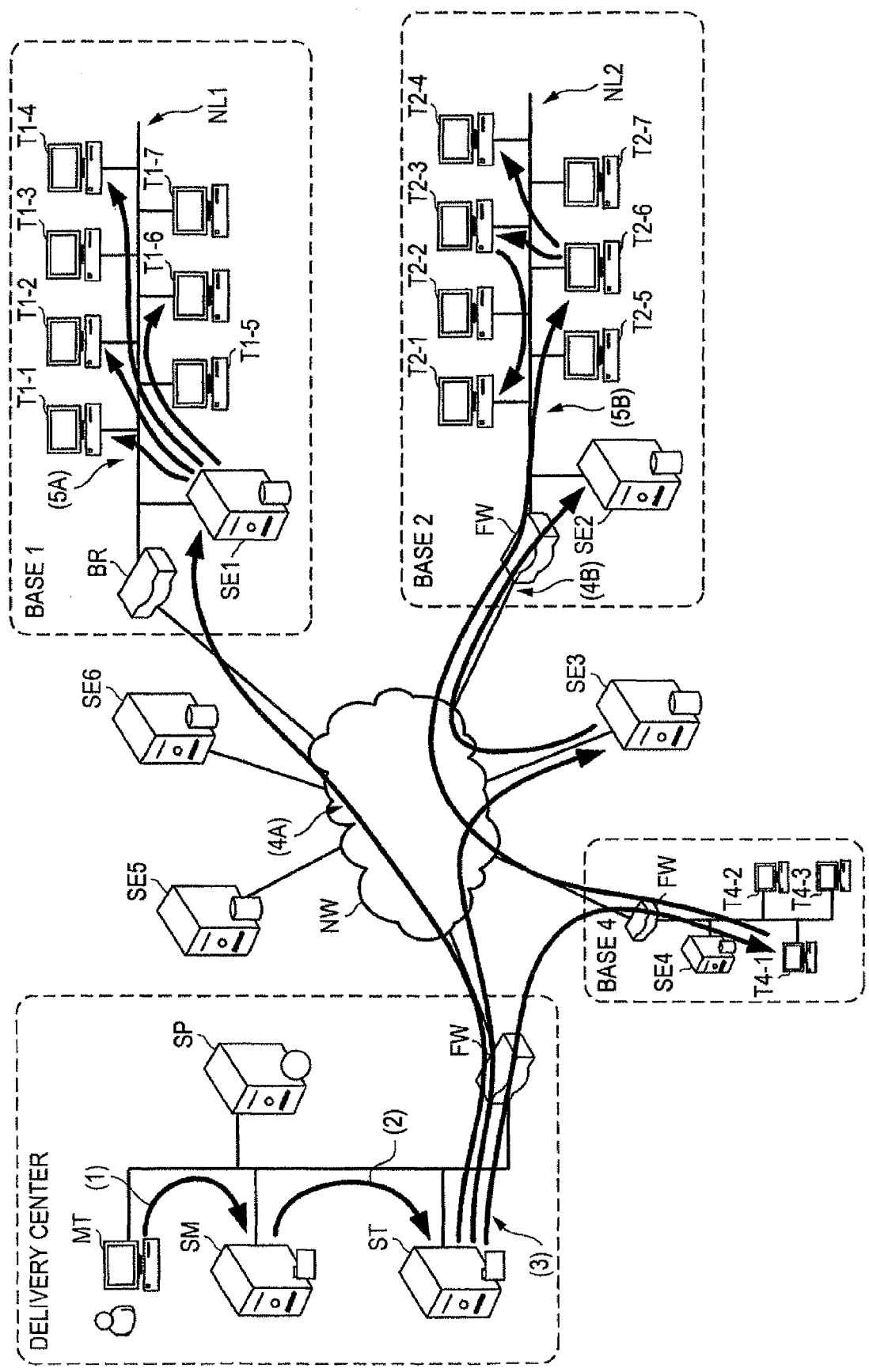
FIG. 6 is a conceptual view showing an example of operation mode designating file delivery in the contents delivery system according to the exemplary embodiment.

Next, switching of an operation mode when the user terminal Tm-n and the edge server SEm acquire contents will be described with reference to FIGS. 5 and 6.

As described above, the user terminal Tm-n and the edge server SEm acquire contents from the P2P network PW.

However, in terms of the bases in view of circumstances of a network security policy, in some cases, the user terminal Tm-n or the edge server SEm may not participate in the P2P network PW. For example, if the base network NLm is constructed by interconnection of a plurality of networks, only a packet of a port number such as a particular well-known port number may be allowed to pass between networks. An example of the port number may include No. 80 of HTTP and the like. In addition, as a packet to be sent from the firewall FW to the network NW, only a packet of a port number such as a particular well-known port number may be allowed. In addition, data may be determined to be exchanged via only a server device provided at headquarters without permitting direct communication between bases m. As used herein, the headquarters is a delivery center or a predetermined base m. In this case, peer-to-peer communication cannot be conducted. In addition, a security policy for the base m may be frequently changed according to system reorganization, department amalgamation and the like.

Therefore, in order for the contents delivery system S to flexibly cope with such changing of the security policy, an operation mode may be changed for each of the user terminal Tm-n and edge server SEm. This operation mode includes a peer-to-peer mode and a client-server mode. Hereinafter, the peer-to-peer mode is call "P2P mode." An initial operation mode is the client-server mode for either the user terminal Tm-n or the edge server SEm.

If the operation mode is the P2P mode, the user terminal Tm-n or the edge server SEm operates to conduct communication in the peer-to-peer mode. That is, the user terminal Tm-n participates in the P2P network PW and the edge server SEm also participates in the P2P network PW. On the other hand, if the operation mode is the client-server mode, the user terminal Tm-n or the edge server SEm operates to conduct communication in the client-server mode. In this case, with the input server ST as a server for the client-server mode, the user terminal Tm-n acquires contents from the edge server SEm. In addition, with the input server ST as a server for the client-server mode, the edge server SEm acquires contents from the input server ST.

Alternatively, if the operation mode is the client-server mode, with the edge server SEm accessing the same base network NLm as a server for the client-server mode, the user terminal Tm-n may acquire contents from the edge server SEm. At this time, the user terminal Tm-n transmits a contents substitute acquisition request message to the edge server SEm. The contents substitute acquisition request message includes a contents ID of the contents. The edge server SEm that received the contents substitute acquisition request message checks whether or not the required contents are stored in a contents cache area. If the contents are stored in the contents cache area, the edge server SEm acquires the contents from the contents cache area and transmits the acquired contents to the user terminal Tm-n of a request source. On the other hand, if the contents are not stored in the contents cache area, the edge server SEm acquires the contents according to an operation mode of the edge server SEm itself. Then, the edge server SEm transmits the acquired contents to the user terminal Tm-n of a request source. In addition, the edge server SEm stores the acquired contents in the contents cache area.

The above-mentioned operation modes are described in an operation mode designating file. This operation mode designating file is an example of scheme information. As shown in FIG. 5, for example, operation modes are divided for each base m and described in the operation mode designating file. Specifically, a base name, an IP address of the edge server SEm and an operation mode of the edge server SEm are first described as base identification information of the base m in the file. In the example of FIG. 5, business site names are shown as an example of base names. In addition, a node ID and an operation mode of each user terminal Tm-n are described in association with the base name of the base m. In addition, in FIG. 5, a client server as an operation mode is represented by "C/S"

Setting and changing of the operation modes are performed in a delivery center. A system administrator collects information on a security policy of each base m and performs the setting and changing of the operation mode in the unit of user terminal Tm-n and the unit of edge sever SEm if the security policy has been changed (FIG. 6(1)). When the operation mode is changed, the management server SM creates a new operation mode designating file reflecting the changed operation mode. Then, the management server SM transmits the created operation mode designating file to the input server ST that is then instructed to deliver contents (FIG. 6(2)). The input server ST assigns a new contents ID to the received operation mode designating file as contents. Then, the input server ST inputs the operation mode designating files as the contents (FIG. 6(3)). At this time, the file may be input in the same manner as typical contents. In addition, the input server ST transmits contents catalog information added with attribute information of the newly created operation mode designating file to each edge server SEm.

Each edge server SEm acquires the newest operation mode designating file periodically. More specifically, an edge server SEm currently operating with the client-server mode, for example, the edge server SE1, acquires the newest operation mode designating file from the input server ST (FIG. 6(4A)). In addition, an edge server SEm currently operating with the P2P mode, for example, the edge server SE2, acquires the newest operation mode designating file from the P2P network PW (FIG. 6(4B)). That is, the edge server SE2 is a contents retention node of the newest operation mode designating file, of the edge servers SEm participating in the P2P network PW, and acquires an operation mode designating file from, for example, the edge server SE3. Accordingly, when the edge server SEm is operating, the user terminal Tm-n can participate in the base P2P network PLm. Accordingly, there is no need to always operate a particular user terminal Tm-n in order to participate in the base P2P network PLm.

Each user terminal Tm-n also acquires the newest operation mode designating file periodically. More specifically, a user terminal Tm-n currently operating with the client-server mode, for example, the user terminal T1-2, acquires the newest operation mode designating file from the edge server SE1 (FIG. 6(5A)). In addition, a user terminal Tm-n currently operating with the P2P mode, for example, the user terminal T2-6, acquires the newest operation mode designating file from the base P2P network PL2 (FIG. 6(5B)). That is, the user terminal T2-6 is a contents retention node of the newest operation mode designating file, of the edge server SE2 participating in the base P2P network PL2 and different user terminals Tm-n, and acquires an operation mode designating file from, for example, the edge server SE2.

In this manner, the operation mode designating file is delivered as contents. Accordingly, there is a need to identify which contents in the contents catalog information is an operation mode designating file. For example, a contents name in attribute information of the operation mode designating file may be assumed as a "operation mode designating mode." By doing so, the attribute information of the operation mode designating file can be searched with the contents name. In addition, for example, the entry for identification information that indicates which file is operation mode designating file may be added to the attribute information in the contents catalog information. In addition, for example, the most significant bit of the contents ID of the operation mode designating file may be set to be 1, while the most significant bits of contents IDs of contents other then the operation mode designating file may be set to be 0. Accordingly, since the operation mode designating file can be acquired though information communication by an overlay network, it is possible to disperse the load on a network by the acquisition of the operation mode designating file.

In addition, when an operation mode designating file is newly created, a new contents ID may be assigned to the created file. Accordingly, there is a need to identify which operation mode designating file in the contents catalog information is the newest operation mode designating file. For example, only attribute information of the newest operation mode designating file of all the created operation mode designating files may be described in the content catalog information. Alternatively, a date on which the operation mode designating file is created may be described in a publication starting date of the attribute information of the operation mode designating file. It can be thus known that an operation mode designating file with the latest publication starting date is the newest operation mode designating file. As another alternative, a valid/invalid flag in the attribute information of only the newest operation mode designating file is set to be valid, while valid/invalid flags of other operation mode designating files may be set to be invalid.

Accordingly, even when a user terminal Tm-n was unable to participate in the base P2P network PLm, the user terminal Tm-n can acquire contents in the client-server scheme. In addition, even when an edge server SEm was unable to participate in the P2P network PW, the edge server SEm can acquire contents in the client-server scheme. Incidentally, if the operation mode is the client-server mode, the user terminal Tm-n may acquire contents from the edge server SEm that accesses the base network NLm, which is an access destination of the user terminal Tm-n.

[7. Configuration and Function of Input Server ST]

Next, a configuration and function of the input server ST will be described with reference to FIG. 7.

Figure 7:
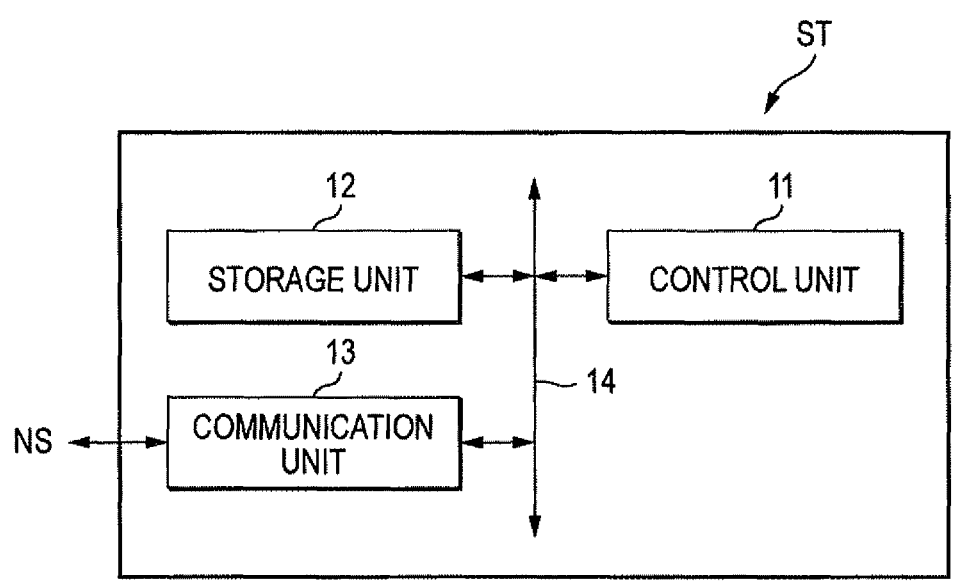
FIG. 7 is a view showing an exemplary configuration of an input server.

As shown in FIG. 7, the input server ST includes a control unit 11 as a computer including a CPU with a computing capability, a RAM for work, a ROM that stores various types of data and programs and the like. The input server ST further includes a storage unit 12 including a HD or the like that stores various types of data and programs and the like. The input server ST further includes a communication unit 13 that controls information communication with the management server SM and the like via the delivery center network NS or controls information communication with the edge servers SEm via the network NW and the like. The control unit 11, the storage unit 12 and the communication unit 13 are interconnected via a bus 14.

A node ID, an IP address, a port number and the like of each edge server SEm and each user terminal Tm-n are stored in the storage unit 12. Contents to be delivered are also stored in the storage unit 12. In addition, an operation mode designating file is stored as contents in the storage unit 12. Further, an operating system, a contents delivery control program, an operation management program, a base server management program and the like are stored in the storage unit 12. Alternatively, these programs may be downloaded from a predetermined server on the delivery center network NS. As another alternative, these programs may be recorded in a recording medium and read therefrom via a drive of the recording medium.

The control unit 11 controls the entire operation of the input server ST by the CPU that reads and executes the programs stored in the storage unit 12 or the like.

[8. Configuration and Function of Edge Server]

Next, a configuration and function of the edge server SEm will be described with reference to FIG. 8.

Figure 8:
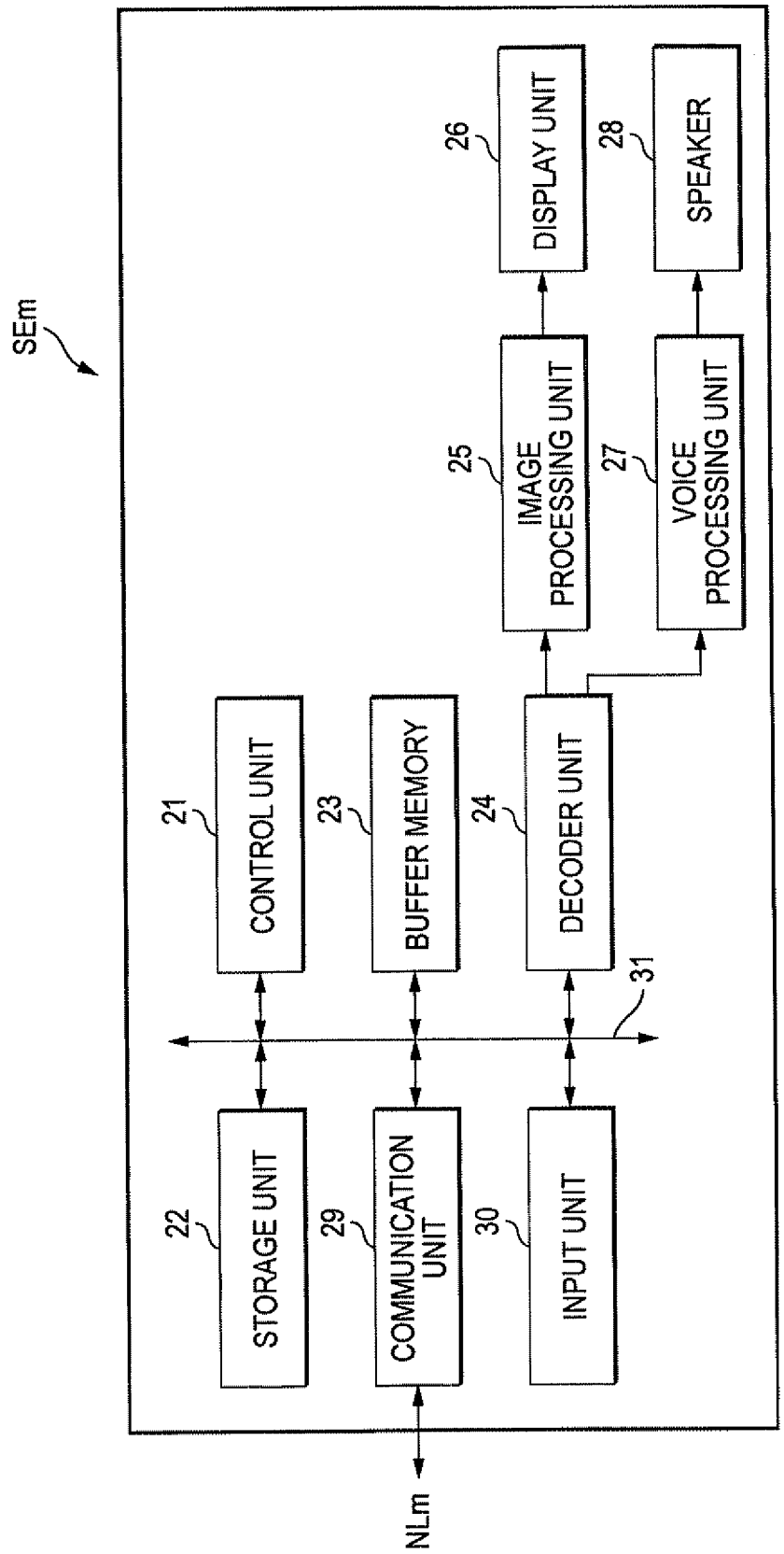
FIG. 8 is a view showing an exemplary configuration of an edge server.

As shown in FIG. 8, the edge server SEm includes a control unit 21 as a computer including a CPU with a computing capability, a RAM for work, a ROM that stores various kinds of data and programs and the like. The edge server SEm further includes a storage unit 22 including a HD (Hard Disk) or the like that stores various kinds of data and programs and the like, and a buffer memory 23 that temporarily stores received contents and the like. The storage unit 22 is an example of a storing unit. In addition, the edge server SEm includes a decoder unit 24 that decodes encoded video data (image information) and audio data (voice information) included in the contents. In addition, the edge server SEm includes an image processing unit 25 that subjects the decoded video data and the like to a predetermined drawing process and outputs the drawn video data and the like as a video signal and the like, and a display unit 26, such as a CRT, a liquid crystal display or the like, which displays an image based on the video signal output from the image processing unit 25. In addition, the edge server SEm includes a voice processing unit 27 which D/A (Digital/Analog) converts the decoded audio data into an analog audio signal, and the analog audio signal is then amplified and output by an amplifier, and a speaker 28 that outputs the audio signal output from the voice processing unit 27 as sound waves. In addition, the edge server SEm includes a communication unit 29 that controls information communication with the user terminal Tm-n via the base network NLm or controls information communication with different edge servers SEm, the input server ST and the like via the network NW. In addition, the edge server SEm includes an input unit (for example, a keyboard, a mouse, a remote controller, an operation panel and the like) 30 that receives an instruction from a user and provides an instruction signal in response to the user instruction to the control unit 21. The control unit 21, the storage unit 22, the buffer memory 23, the decoder unit 24, the communication unit 29 and the input unit 30 are interconnected via a bus 31. The edge server SEm may be implemented by, for example, a personal computer as well as a dedicated server device. If a user does not reproduce and use contents on the edge sever, the decoder unit 24, the image processing unit 25, the display unit 26, the voice processing unit 27, the speaker 28 and the input unit 30 are not necessary.

A routing table using DHT, index information, contents catalog information, an operation mode designating file, an acquired list and the like are stored in the storage unit 22. The contents IDs of contents that have been acquired until the present are registered in the acquired list. In addition, an IP address and a port number of a contact node, which becomes an access destination when it participates in the P2P network PW, an IP address and a port number of the input server ST and the like are stored in the storage unit 22. In addition, base identification information of a base m at which the edge server SEm is located, and a node ID assigned to the edge server SEm are stored in the storage unit 22. In addition, a contents cache area is assigned to some of the storage capacity of the storage unit 22. Contents are stored in this contents cache area. In addition, an operating system, an edge server proxy program, P2P software and the like are stored in the storage unit 22. The P2P software includes external P2P software for accessing the P2P network PW and internal P2P software for accessing the internal P2P network PLm. Alternatively, these programs may be downloaded from, for example, the input server ST. As another alternative, these programs may be recorded in a recording medium and read therefrom via a drive of the recording medium.

[9. Configuration and Function of User Terminal]

Next, a configuration and function of the user terminal Tm-n will be described with reference to FIG. 9.

Figure 9:
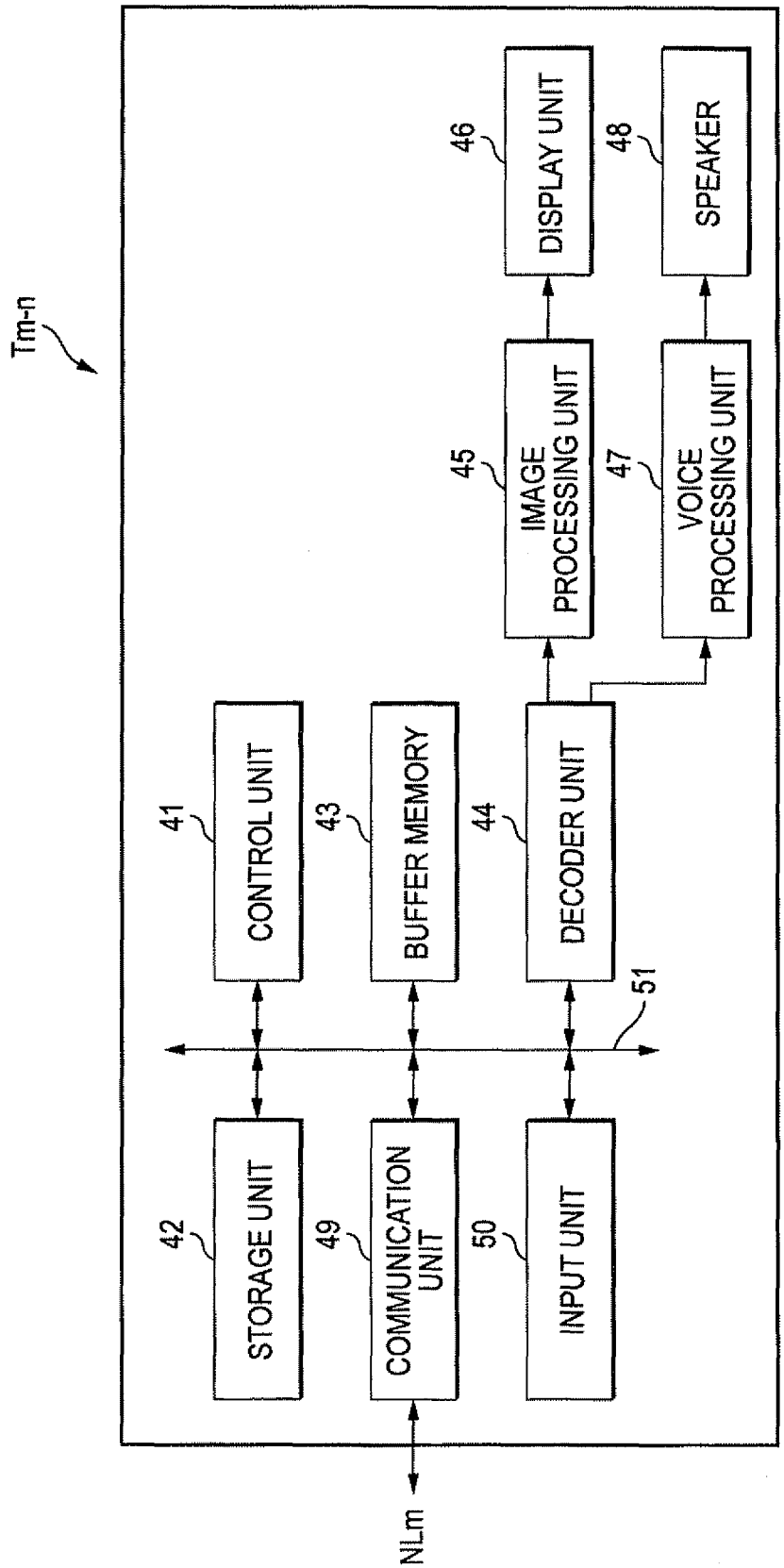
FIG. 9 is a view showing an exemplary configuration of a user terminal.

As shown in FIG. 9, the user terminal Tm-n includes a control unit 41, a storage unit 42, a buffer memory 43, a decoder unit 44, an image processing unit 45, a display unit 46, a voice processing unit 47, a speaker unit 48, a communication unit 49, an input unit 50 and a bus 51. The control unit 41, the storage unit 42, the buffer memory 43, the decoder unit 44, the image processing unit 45, the display unit 46, the voice processing unit 47, the speaker unit 48, the input unit 50 and the bus 51 have the same basic configuration and function as the control unit 21, the storage unit 22, the buffer memory 23, the decoder unit 24, the image processing unit 25, the display unit 26, the voice processing unit 27, the speaker unit 28, the input unit 30 and the bus 31 for the edge server SEm. The user terminal Tm-n may be implemented by, for example, a personal computer or the like.

The communication unit 49 controls information communication with different user terminals Tm-n and the edge server SEm via the base network NLm or controls information communication with the portal server SP and the like via the network NW.

A routing table using DHT, index information, contents catalog information, an operation mode designating file, an acquired list and the like are stored in the storage unit 42. In addition, an IP address, a port number and the like of a contact node that is an access destination when the contact node participates in the P2P network PW, and an IP address, a port number and the like of the input server ST are stored in the storage unit 42. In addition, base identification information of a base m at which the user terminal Tm-n is located, and a node ID assigned to the user terminal Tm-n are stored in the storage unit 42. In addition, a contents cache area is assigned to some of the storage capacity of the storage unit 42. Contents are stored in this contents cache area. In addition, an operating system, a user contents acquisition program, P2P software, a Web browser, a player program and the like are stored in the storage unit 42. These programs may be downloaded from, for example, the edge server SEm, the portal server SP and the like. Alternatively, these programs may be recorded in a recording medium and read therefrom via a drive of the recording medium.

[10. Operation of Contents Delivery System]

Next, an operation of the contents delivery system S according to this embodiment will be described with reference to FIGS. 10 to 16B.

Figure 10:
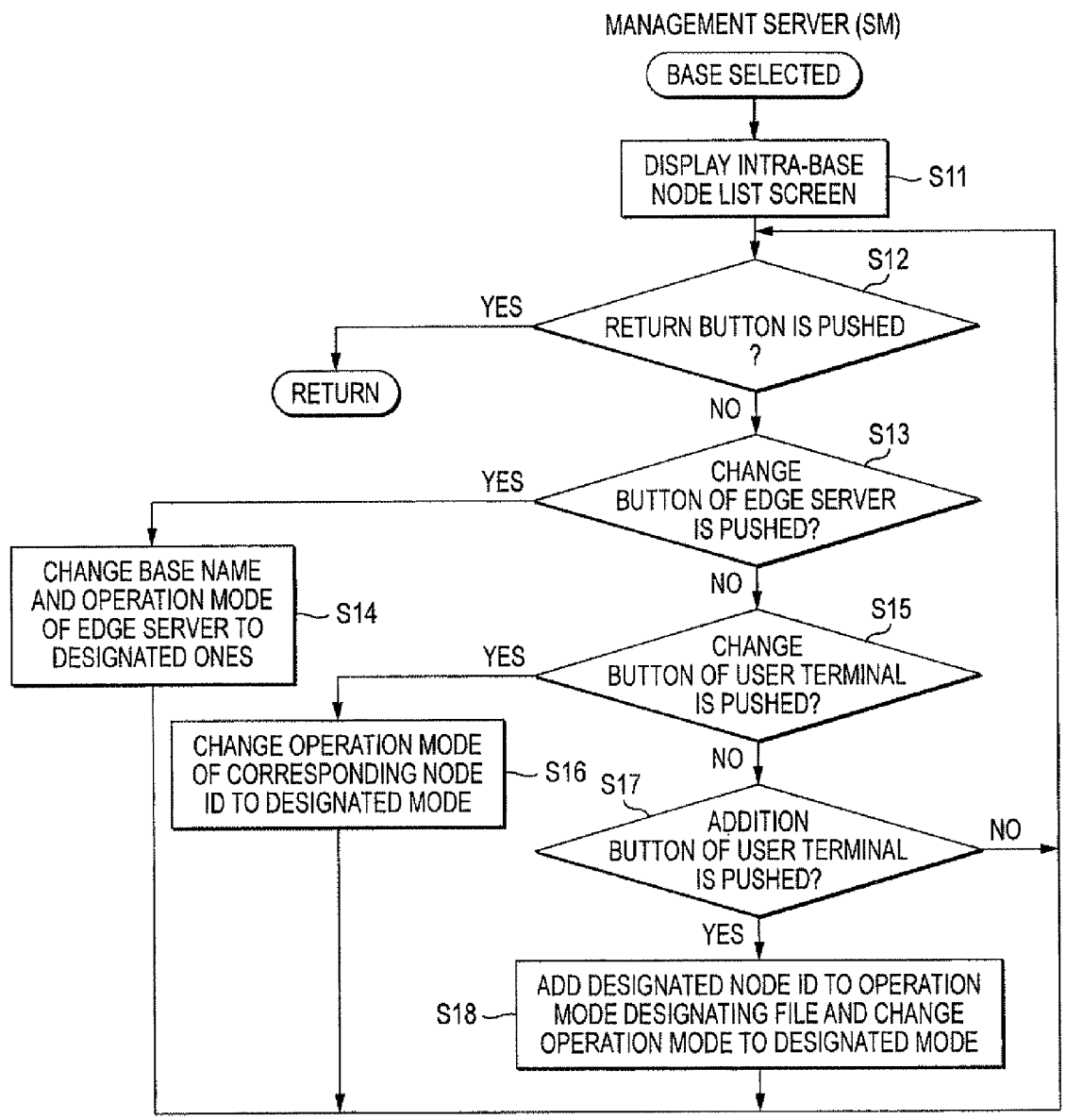
FIG. 10 is a flow chart showing an exemplary process of a management server according to the exemplary embodiment.

As shown in FIG. 10, the management server SM instructs the management terminal MT to display a management screen for setting an operation mode according to a request from the management terminal MT. When a HTML document is sent from the management server SM to the management terminal MT, this management screen is displayed by the management terminal MT based on the received HTML document. Now, assume that the management server SM instructs the management terminal MT to display a base list screen. At this time, if a system administrator selects one of the bases m displayed on the screen and pushes a change button, a control unit provided in the management server SM starts a process shown in FIG. 10.

First, the management server SM instructs the management terminal MT to display an intra-base node list screen (Step S11). More specifically, the management server SM acquires a base name of a base m selected by the system administrator, an operation mode of the edge server SEm, and a node ID and operation mode of each user terminal Tm-n for a base list screen from an operation mode designating file. Next, the management server SM generates a HTML document for the intra-base node list screen based on the acquired information. Then, the management server SM transmits the generated HTML document to the management terminal MT.

Figure 11:
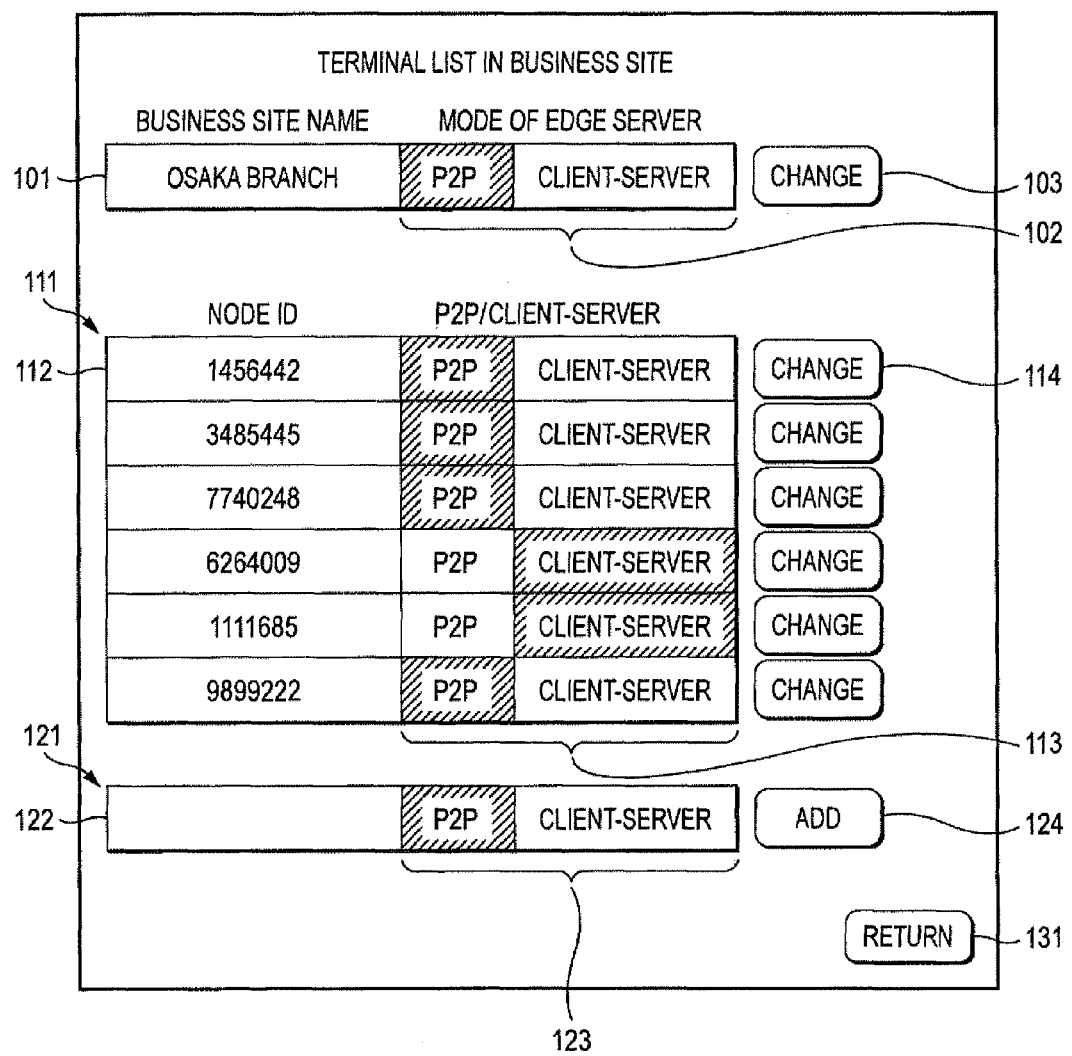
FIG. 11 is a view showing an example of a display of an intra-base node list screen.

As shown in FIG. 11, on the intra-base node list screen are displayed a base name input column 101, an operation mode selection button 102, a change button 103, a terminal list 111, a change button 114, a terminal addition form 121, an addition button 124 and a return button 131.

The base name input column 101 is an input column for input of a base name. The base name input column 101 is in a default state where a base name described in an operation mode designating file has been already input. The operation mode selection button 102 is a button for selection of an operation mode of the edge server SEm. The operation mode selection button 102 is in a default state where a button corresponding to an operation mode of the edge server SEm described in the operation mode designating file has been already selected. The change button 103 is a button for changing a base name and an operation mode of the edge server SEm.

On the terminal list 111, a node ID 112 and an operation mode selection button 113 for each user terminal Tm-n are displayed. The node ID 112 is presented with a node ID of the user terminal Tm-n described in the operation mode designating file. The operation mode selection button 113 is a button for selecting an operation mode of the user terminal Tm-n. The operation mode selection button 113 is in a default state where a button corresponding to an operation mode of the user terminal Tm-n described in the operation mode designating file has been already selected. The change button 114 is displayed for each user terminal Tm-n. The change button 114 is a button for changing an operation mode of the user terminal Tm-n. The node ID 112 may be presented with information other than a node ID. For example, information that can identify user terminals Tm-n may be presented.

The terminal addition form 121 is presented with a node ID input column 122 and an operation mode selection button 123. The node ID input column is an input column for input of a node ID of the user terminal Tm-n to be added to a selected base m. The operation mode selection button 123 is a button for selection of an operation mode of the added user terminal Tm-n. The addition button 124 is a button for addition of a new user terminal Tm-n to the selected base m.

When the intra-base node list screen is displayed by the management terminal MT, the management server SM determines whether or not the return button 131 is pushed by the system administrator (Step S12). If the return button 131 is not pushed (NO in Step S12), the management server SM determines whether or not the change button 103 is pushed by the system administrator (Step S13). If the change button 103 is pushed (YES in Step S13), the management server SM changes a base name and an operation mode of the edge server SEm (Step S14). More specifically, the management server SM acquires a base name input in the base name input column 101 and an operation mode selected by the operation mode selection button 102 from the management terminal MT. Then, the management server SM changes the base name of the selected base m and the operation mode of the edge server SEm in the operation mode designating file to the base name and the operation mode acquired from the management terminal MT, respectively. After completing Step S14, the management server SM returns to Step S12.

On the other hand, if the change button 103 is not pushed (NO in Step S13), the management server SM determines whether or not any change button 114 is pushed (Step S15). If any change button 114 is pushed (YES in Step S15), the management server SM changes the operation mode of the user terminal Tm-n (Step S16). More specifically, the management server SM acquires a node ID of the user terminal Tm-n corresponding to the pushed change button 114 and an operation mode selected by the operation mode selection button 113 from the management terminal MT. Then, the management server SM changes the operation mode corresponding to the node ID acquired from the management terminal MT to the operation mode acquired from the management terminal MT in the operation mode designating file. After completing Step S16, the management server SM returns to Step S12.

On the other hand, if any change button 114 is not pushed (NO in Step S15), the management server SM determines whether or not the addition button 124 is pushed by the system administrator (Step S17). If the addition button 124 is pushed (YES in Step S17), the management server SM adds information of the user terminal Tm-n to the operation mode designating file (Step S18). More specifically, the management server SM acquires a node ID input in the node ID input column 122 and an operation mode selected by the operation mode selection button 123 from the management terminal MT. Then, the management server SM adds the acquired node ID and operation mode to the operation mode designating file in association with the base name of the selected base m.

If the addition button 124 is not pushed (NO in Step S17) or when Step S18 is completed, the management server SM returns to Step S12.

In Step S12, if the return button 131 is pushed (YES in Step S12), the management server SM terminates the process shown in FIG. 10 and instructs the management terminal MT to display the base list screen. The operation mode designating file that is changed according to the above process is sent from the management server SM to the input server ST and is, for example, delivered by the input server ST.

Figure 12A:
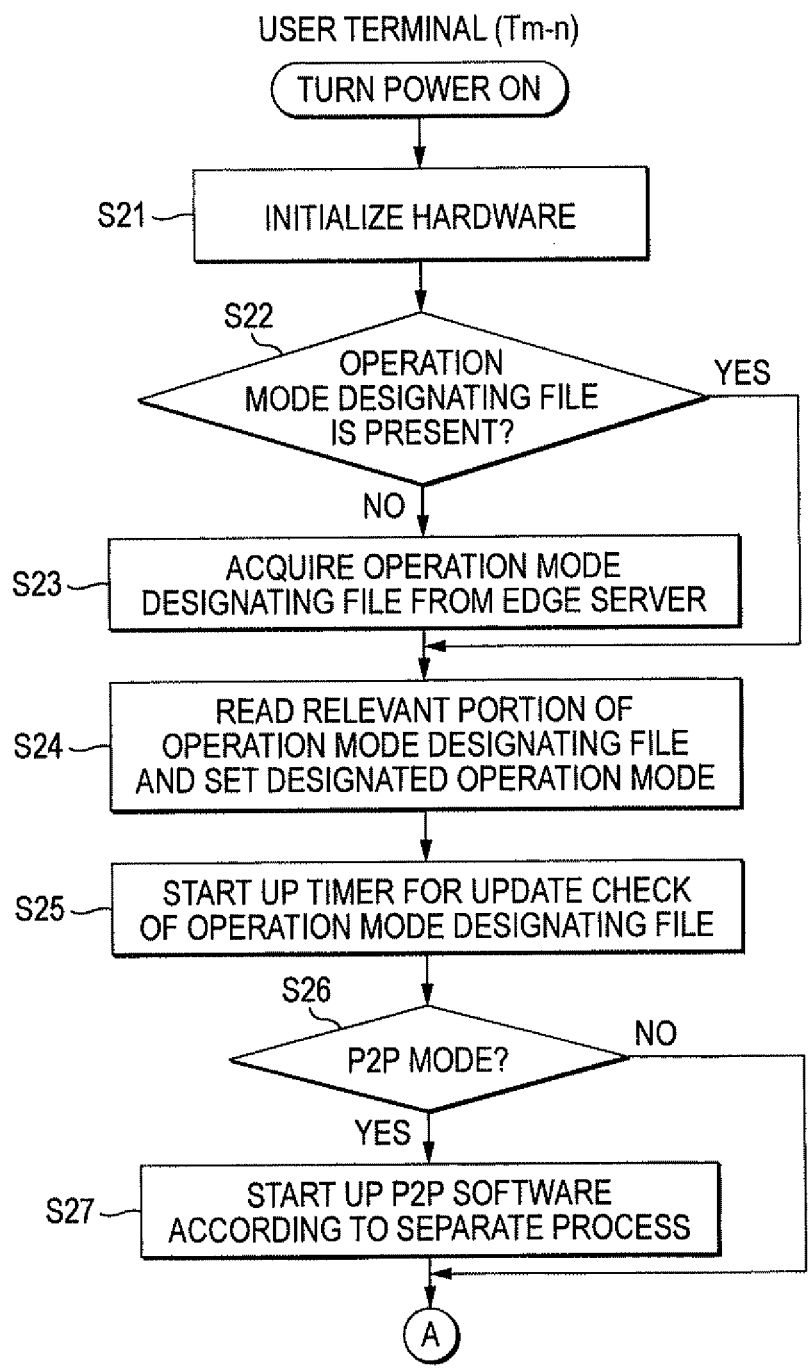

A process of FIGS. 12A and 12B starts when the power of the user terminal Tm-n is turned ON. First, the control unit 41 starts up a user contents acquisition program and initializes hardware of the user terminal Tm-n (Step S21). Next, the control unit 41 determines whether or not an operation mode designating file is stored in the storage unit 42 (Step S22). If an operation mode designating file is not stored in the storage unit 42 (NO in Step S22), the control unit 41 acquires the newest operation mode designating file from the input server ST (Step S23). Due to the absence of operation mode designating file, the control unit 41 acquires an operation mode designating file in a client-server mode. More specifically, the control unit 41 acquires a contents ID of the newest operation mode designating file from contents catalog information. Then, the control unit 41 transmits a contents request message including the acquired contents ID to the input server ST. Thereafter, the control unit 41 receives the operation mode designating file transmitted from the input server ST. Then, the control unit 41 stores the received operation mode designating file in the storage unit 42.

If an operation mode designating file is stored in the storage unit 42 in Step S22 (YES in Step S22) or when Step S23 is completed, the control unit 41 reads a relevant portion from the operation mode designating file and sets a designated operation mode (Step S24). More specifically, the control unit 41 acquires base identification information of the base m, which the user terminal Tm-n itself is provided, and a node ID of the user terminal Tm-n itself from the storage unit 42. Next, the control unit 41 acquires an operation mode corresponding to base identification information and the acquired node ID from the operation mode designating file. Then, the control unit 41 stores the acquired operation mode in a RAM as a global variable. In addition, if it is determined in Step S22 that an operation mode designating file is stored in the storage unit 42, an operation mode designating file to be read is a previously acquired operation mode designating file. On the other hand, when Step S23 was performed, an operation mode designating file to be read is the operation mode designating file acquired in Step S23.

Next, the control unit 41 starts up a timer for updating the operation mode designating file (Step S25). This timer for updating is set to, for example, 30 minutes. Setting and countdown of the timer are implemented by a count function of the CPU of the control unit 41.

Next, the control unit 41 determines whether or not the operation mode set in Step S24 is a P2P mode (Step S26). If the operation mode is a P2P mode, the control unit 41 starts up P2P software according to a process other than the contents acquisition program (Step S27). Upon starting up the P2P software, the user terminal Tm-n participates in the P2P network PW.

If the operation mode is a client-server mode in Step S26 (NO in Step S26) or when Step S27 is completed, the control unit 41 starts up a Web browser (Step S28). Next, the control unit 41 instructs the display unit 46 to display a Web page for selection of contents (Step S29). More specifically, the control unit 41 sends a HTTP (Hyper Text Transfer Protocol) request to the portal server SP. Thereafter, the control unit 41 receives a HTML document sent from the portal server SP. Then, the control unit 41 displays a contents selection screen based on the received HTML document.

A contents list is displayed on the contents selection screen. The contents list is presented with a contents name and a contents thumbnail for each of the contents. In addition, a play button is presented for each of the contents. In the received HTML document, a tag corresponding to the play button is described with identification information or the like that designates, for example, a contents name of the contents to be played, a contents ID, and a player program to play contents.

After the contents selection screen is displayed, the control unit 41 determines whether or not contents are required to be played (Step S30). That is, the control unit 41 determines whether or not any play button is selected by a user. If contents are not required to be played (NO in Step S30), the control unit 41 determines whether or not the power is required to be turned OFF by a user (Step S39). If the power is not required to be turned OFF (NO in Step S39), the control unit 41 returns to Step S29.

If contents are required to be played in Step S30 (YES in Step S30), the control unit 41 determines whether or not the current operation mode is a P2P mode (Step S31).

If the operation mode is a P2P mode (YES in Step S31), the control unit 41 instructs the P2P software to acquire contents (Step S32). More specifically, the control unit 41 acquires a contents ID from a tag corresponding to the play button selected by a user. Next, the control unit 41 designates the acquired contents ID for the P2P software and instructs the P2P software to acquire the contents.

On the other hand, if the operation mode is a client-server mode (NO in Step S31), the control unit 41 acquires contents from the input server ST (Step S33). More specifically, the control unit 41 acquires a contents ID from a tag corresponding to the play button selected by a user. Then, the control unit 41 transmits a contents request message including the acquired contents ID to the input server ST. Incidentally, in Step S32 and Step S33, the control unit 41 may acquire a contents name from the tag corresponding to the play button selected by the user and search a content ID of corresponding contents from the contents catalog information based on the acquired contents name.

After Step S32 or S33 is completed, the control unit 41 determines whether or not the contents acquisition is completed (Step S34). If the contents acquisition is not completed (NO in Step S34), the control unit 41 determines whether or not there is a contents acquisition error (Step S35). If there is no contents acquisition error (NO in Step S35), the control unit 41 returns to Step S34. On the other hand, if there is a contents acquisition error (YES in Step S35), the control unit 41 instructs the display unit 46 to display an error message (Step S36). Then, the control unit 41 returns to Step S29.

If the contents acquisition is completed in Step S34 (YES in Step S34), the control unit 41 starts up a player program to play the acquired contents (Step S37). In addition, when Step S33 was performed, the control unit 41 stores the contents acquired from the edge server SEm in a contents cache area of the storage unit 42. Next, the control unit 41 waits until the playing of the contents is completed by the player program or the playing of the contents is stopped by manipulation of a user (Step S38). When the playing of the contents is ended, the control unit 41 returns to Step S29.

If the power is required to be turned OFF in Step S39 (YES in Step S39), the control unit 41 ends the process shown in FIGS. 12A and 12B.

Figure 13:
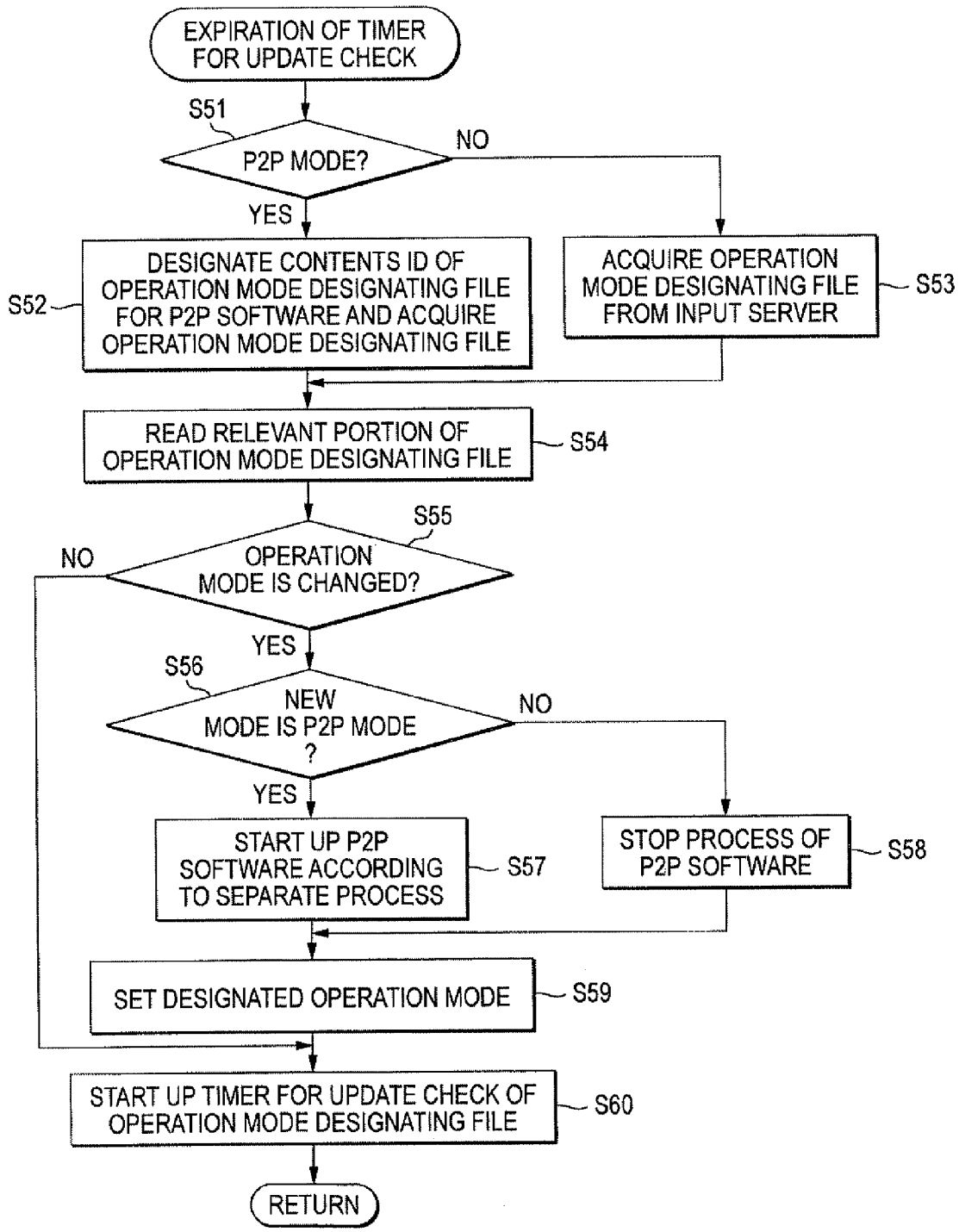
FIG. 13 is a flow chart showing an exemplary operation mode control process of a control unit for the user terminal according to the exemplary embodiment.

As shown in FIG. 13, when the timer for updating of the operation mode designating file expires, a timer interruption event occurs. When the timer interruption event occurs, the step being currently performed is suspended and the operation mode control process shown in FIG. 13 starts. First, the control unit 41 determines whether or not the current operation mode is a P2P mode (Step S51).

If the operation mode is a P2P mode (YES in Step S51), the control unit 41 instructs the P2P software to acquire an operation mode designating file (Step S52). More specifically, the control unit 41 acquires a contents ID of the newest operation mode designating file from the contents catalog information. Next, the control unit 41 designates the acquired contents ID for the P2P software and instructs the P2P software to acquire contents. Then, the control unit 41 waits until a successful contents acquisition message corresponding to the operation mode designating file is received from the P2P software.

On the other hand, if the operation mode is a client-server mode (NO in Step S51), the control unit 41 acquires the newest operation mode designating file from the input server ST (Step S53). This step is the same as Step S23 shown in FIG. 12A.

After Step S52 or S53 is completed, the control unit 41 reads a relevant portion from the operation mode designating file and sets a designated operation mode (Step S54). More specifically, the control unit 41 acquires a node ID of the user terminal Tm-n itself, and base identification information of the base m, which the user terminal Tm-n itself is provided, from the storage unit 42. Next, the control unit 41 acquires an operation mode corresponding to the acquired node ID and base identification information from the operation mode designating file.

Next, the control unit 41 determines whether or not the operation mode is changed (Step S55). More specifically, the control unit 41 determines whether or not the operation mode acquired in Step S54 is different from the current operation mode. If the operation mode is changed (YES in Step S55), the control unit 41 determines whether or not the changed operation mode is a P2P mode (Step S56). If the changed operation mode is a P2P mode (YES in Step S56), the control unit 41 starts up the P2P software according to a process other than the contents acquisition program (Step S57). On the other hand, if the changed operation mode is a client-server mode (NO in Step S56), the control unit 41 stops the process of the active P2P software (Step S58). When the process of the P2P software is stopped, the user terminal Tm-n withdraws from the P2P network PW.

After Step S57 or S58 is completed, the control unit 41 sets a designated operation mode (Step S59). More specifically, the control unit 41 rewrites an operation mode as a global variable stored in the RAM into the operation mode acquired in Step S54.

If the operation mode is not changed in Step S55 or when Step S59 is completed, the control unit 41 starts up the timer for updating of the operation mode designating file (Step S60). According to this step, the operation mode control process is performed again after a predetermined period of time elapses.

Then, the control unit 41 ends the operation mode control process and restarts to perform the suspended step.

A timing at which the operation mode control process starts is not limited to when the interruption event for the timer for update occurs. For example, the operation mode control process may start when an instruction is received from a different device. For example, when the system administrator operates a management terminal, the operation mode is instructed to be changed. Then, the input server ST receiving this instruction sends an operation mode change instruction message to each edge server SEm. The edge server SEm that received the operation mode change instruction message performs an operation mode control process. The edge server SEm that received the operation mode change instruction message sends the operation mode change instruction message to each user terminal Tm-n that exists in the same base. Then, the user terminal Tm-n that received the operation mode change instruction message performs the operation mode control process.

Figure 14:
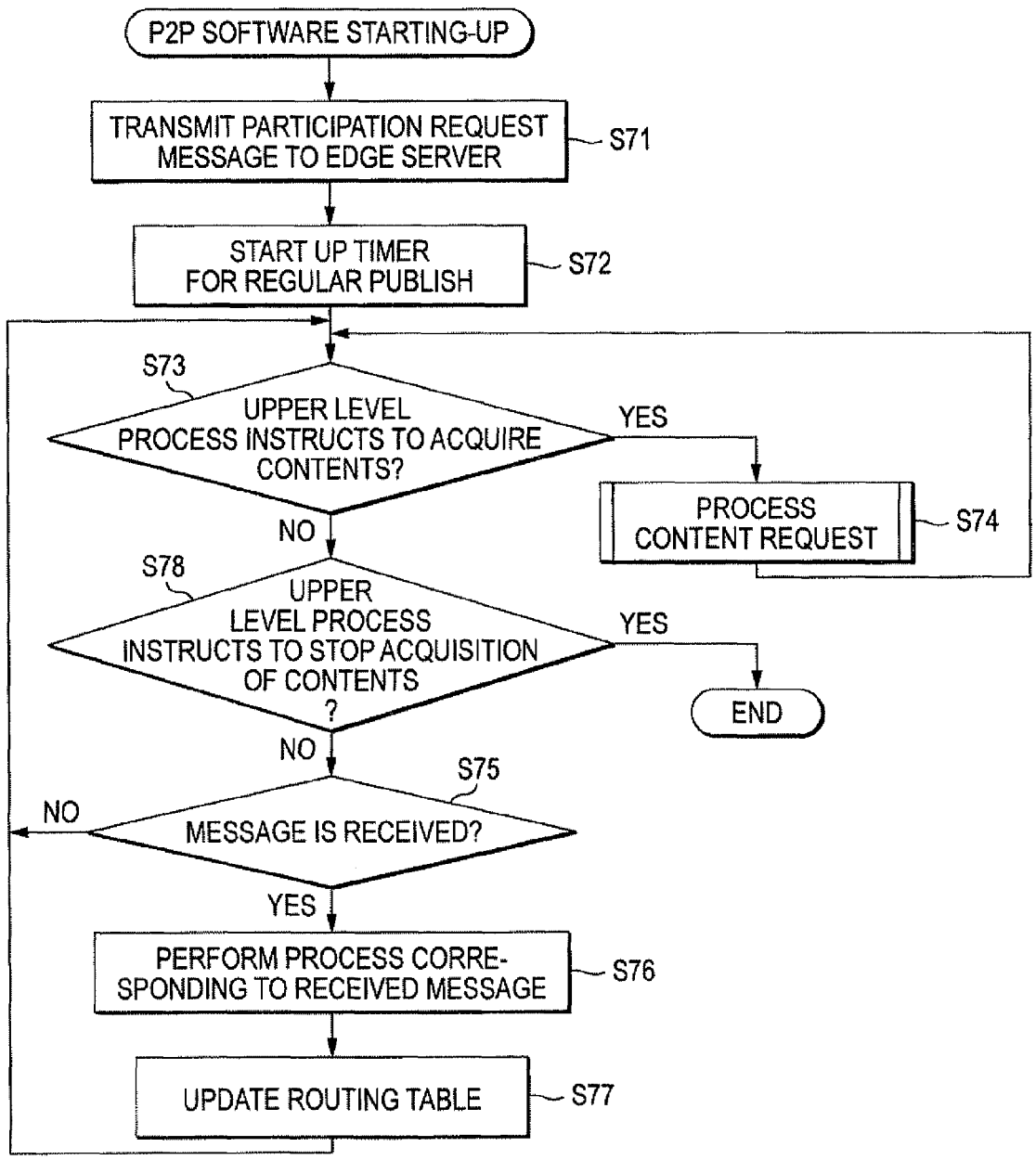
FIG. 14 is a flow chart showing an exemplary P2P software main process for the user terminal according to the exemplary embodiment.

The P2P software main process shown in FIG. 14 starts when the P2P software starts up from the user contents acquisition program, which is an upper level process. First, the control unit 41 transmits a participation request message to the input server ST as a contents node (Step S71). Thereafter, the control unit 41 receives a participation response message transmitted from a plurality of nodes including the input server ST as the contact node in response to the transmission of the participation request message. Then, the control unit 41 creates a routing table based on node information included in the received participation response message.

Next, the control unit 41 starts up a regular publish timer (Step S72). The regular publish timer is set to, for example, 5 minutes. When the regular publish timer expires, publish messages for all contents stored by the user terminal Tm-n are transmitted. In some cases, a root node of contents stored by the user terminal Tm-n may withdraw from the P2P network PW. Even in these cases, the control unit 41 transmits the publish message regularly so that a user node can search the location of contents.

Next, the control unit 41 determines whether or not the user contents program, which is an upper level process, issues an instruction to acquire contents (Step S73). If an instruction to acquire contents is issued (YES in Step S73), the control unit 41 performs a contents request process (Step S74). Then, the control unit 41 returns to Step S73.

On the other hand, if no instruction to acquire contents is issued (NO in Step S73), the control unit 41 determines whether or not the user contents program, which is an upper level process, issues an instruction to stop the acquisition of contents (Step S78). If no instruction to stop the acquisition of contents is issued (NO in Step S78), the control unit 41 determines whether or not any message is received from a different node (Step S75). An example of the message may include a participation request message, a participation response message, a contents location inquiry message, a publish message, a contents request message, etc. If no message is received (NO in Step S75), the control unit 41 returns to Step S73.

On the other hand, if any message is received (YES in Step S75), the control unit 41 performs a process corresponding to the received message (Step S76). Next, the control unit 41 updates the routing table (Step S77). In some cases, a node in which node information is registered in the routing table may withdraw from the P2P network PW. Therefore, the control unit 41 is kept up to date with the routing table. More specifically, the control unit 41 acquires node information of a node, which is a message relay source, from the received message. Then, the control unit 41 compares a node ID included in the node information with a node ID of the user terminal Tm-n itself stored in the storage unit 42 and determines a location of the routing table in which the node information is registered. Then, the control unit 41 rewrites the node information of the determined location into the acquired node information. The routing table is updated with a predetermined probability. After Step S77 is completed, the control unit 41 returns to Step S73.

If an instruction to stop the acquisition of contents is issued in Step S78 (YES in Step S78), the control unit 41 ends the P2P software main process.

In addition, if the input server ST participates in the P2P network PW, the P2P software is also executed in the input server ST. A process performed by the input server ST at this time is essentially the same as the P2P software main process of the user terminal Tm-n shown in FIG. 14. However, if the input server ST is a contact node in the P2P network PW, the transmission of the participation request message shown in Step S71 is not performed. In addition, since the input server ST need not acquire contents from other nodes, the input server ST does not require the contents request process shown in Step S74.

Figure 15A:
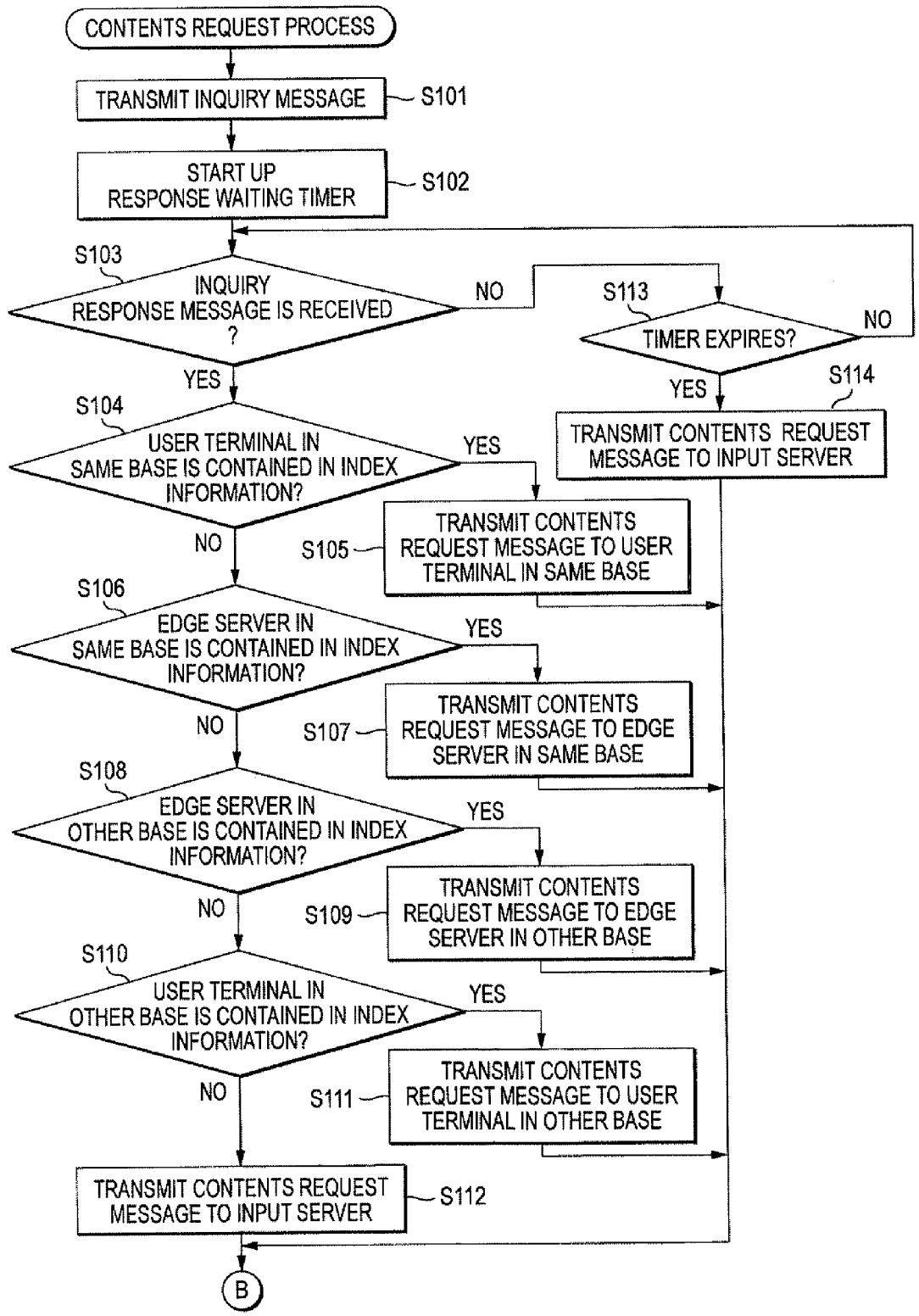
FIGS. 15A and 15B are flow charts each showing an exemplary contents request process for the user terminal according to the exemplary embodiment.
Figure 15B:
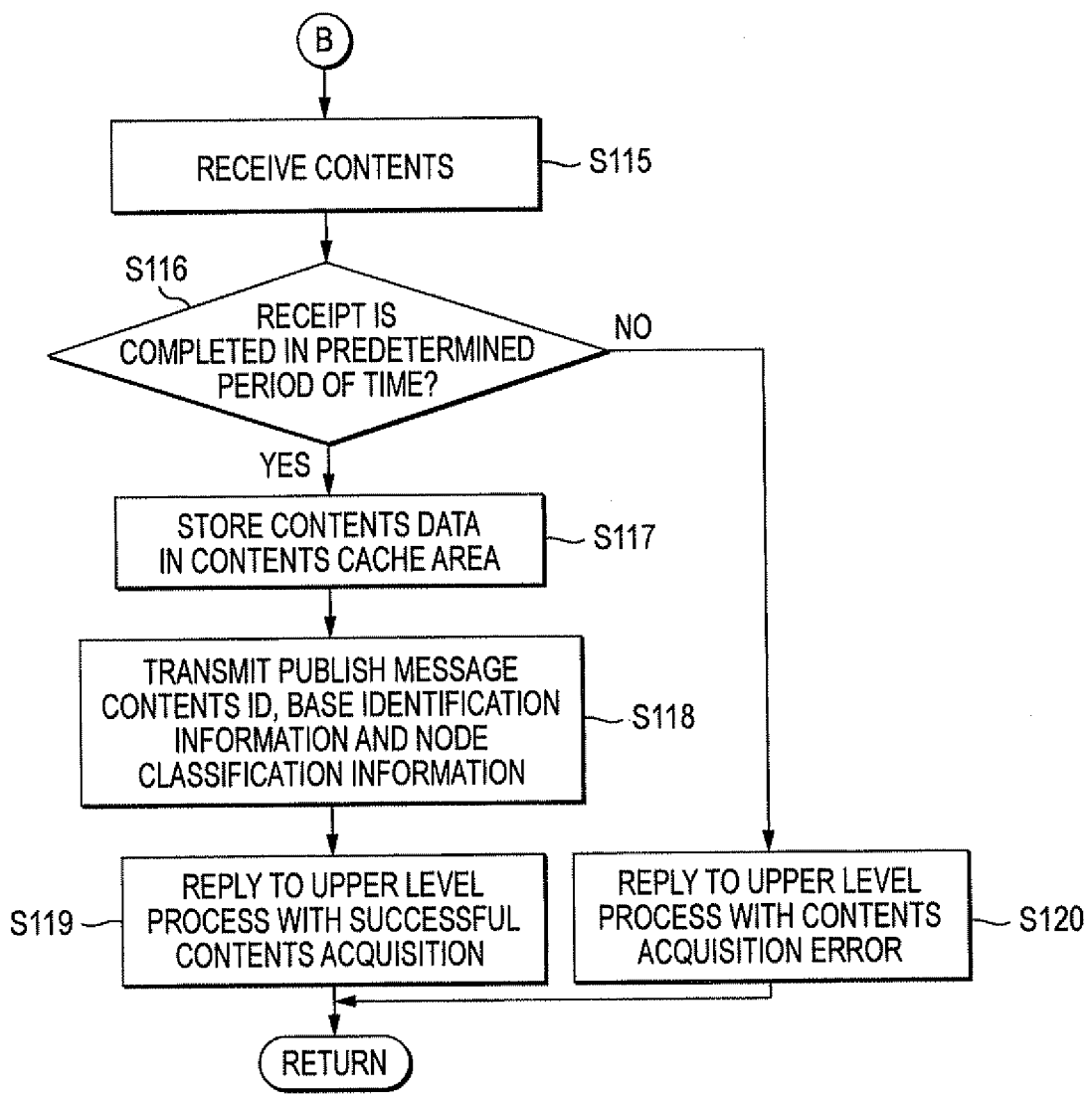

The contents request process shown in FIGS. 15A and 15B starts when this process is called from the P2P software main process. First, the control unit 41 sends a contents location inquiry message toward a root node (Step S101). The contents location inquiry message includes a contents ID designated by the user contents acquisition program that is an upper level process. Next, the control unit 41 starts up a response waiting timer (Step S102). The response waiting timer is set to, for example, 30 seconds.

Next, the control unit 41 determines whether or not a contents inquiry response message is received (Step S103). If a contents inquiry response message is received (YES in Step S103), the control unit 41 determines whether or not node information of the user terminal Tm-n in the same base exists in index information included in the contents inquiry response message (Step S104). That is, the control unit 41 determines whether or not one of the user terminals Tm-n in the same base stores the contents. This is done by determining whether or not a set of the same base identification information as the base identification information of the base m at which the user terminal Tm-n is located and node classification information indicating a user terminal, which are stored in the storage unit 42, is registered in the index information. If the node information of the user terminal Tm-n in the same base exists in index information (YES in Step S104), the control unit 41 transmits a contents request message to any of the user terminals Tm-n in the same base in which the node information exists in the index information (Step S105).

On the other hand, if no node information of the user terminal Tm-n in the same base exists in index information (NO in Step S104), the control unit 41 determines whether or not node information of the edge server SEm in the same base exists in index information included in the contents inquiry response message (Step S106). That is, the control unit 41 determines whether or not the edge server SEm in the same base stores the contents. This is done by determining whether or not the same base identification information as the base identification information of the base m at which the user terminal Tm-n is located, which is stored in the storage unit 42, is registered in the index information. If the node information of the edge server SEm in the same base exists in index information (YES in Step S106), the control unit 41 transmits a contents request message to the edge server SEm in the same base (Step S107).

On the other hand, if no node information of the edge server SEm in the same base exists in index information (NO in Step S106), the control unit 41 determines whether or not node information of the edge server SEm in another base exists in index information included in the contents inquiry response message (Step S108). That is, the control unit 41 determines whether or not the edge server SEm in another base stores contents. This is done by determining whether or not node classification information indicating an edge server is registered in the index information. If the node information of the edge server SEm in another base exists in index information (YES in Step S108), the control unit 41 transmits a contents request message to any of edge servers SEm in the other base in which the node information exists in the index information (Step S109).

On the other hand, if no node information of the edge server SEm in other base exists in index information (NO in Step S108), the control unit 41 determines whether or not node information of the user terminal Tm-n in another base exists in index information included in the contents inquiry response message (Step S110). That is, the control unit 41 determines whether or not one of the user terminals Tm-n in another same base stores the contents. This is done by determining whether or not node classification information indicating a user terminal is registered in the index information. If the node information of the user terminal Tm-n in another base exists in index information (YES in Step S110), the control unit 41 transmits a contents request message to any of the user terminals Tm-n in which the node information exists in the index information (Step S111).

On the other hand, if no node information of the user terminal Tm-n in another base exists in index information (NO in Step S110), the control unit 41 transmits a contents request message to the input server (Step S112).

If no contents inquiry response message is received in Step S103 (NO in Step S103), the control unit 41 determines whether or not the response waiting timer has expired (Step S113). If the response waiting timer has not expired (NO in Step S113), the control unit 41 returns to Step S103. On the other hand, if the response waiting timer has expired (YES in Step S113), the control unit 41 transmits a contents request message to the input server (Step S114).

After Step S105, S107, S109, S111, S112 or S114 is completed, the control unit 41 starts to receive contents from the contents retention node, the edge server SEm or the input server ST (Step S115).

Next, the control unit 41 determines whether or not the contents receipt has been completed within a predetermined period of time from the start of contents receipt (Step S116). If the contents receipt has been completed with a predetermined period of time (YES in Step S116), the control unit 41 stores the received contents in a contents cache area (Step S117). At this time, if the available capacity of the contents cache area is smaller than data size of the received contents, the control unit 41 removes contents from the contents cache area until the available capacity becomes equal to or larger than the data size of the received contents. More specifically, the control unit 41 deletes the contents with the contents with the older timestamps being deleted first. A date pointed by a timestamp of the contents is basically a date on which the contents are stored. However, when the stored contents are used, the timestamp is updated to the use date. When the available capacity of the contents cache area is secured, the control unit 41 stores the received contents in the contents cache area.

Next, the control unit 41 transmits a publish message for the stored contents to the root node (Step S118). Node information of the user terminal Tm-n, a contents ID of the stored contents, and base identification information of the base m in which the user terminal Tm-n itself is located and node classification information indicating a user terminal, which are stored in the storage unit 42, are included in the publish message. Next, the control unit 41 replies to the user contents program, which is an upper level process, with a successful contents acquisition message (Step S119).

If the contents receipt has been not completed with a predetermined period of time in Step S116 (NO in Step S116), the control unit 41 replies to the user contents program, which is an upper level process, with a contents acquisition error (Step S120).

After Step S119 or S120 is completed, the control unit 41 ends the contents request process.

Figure 16A:
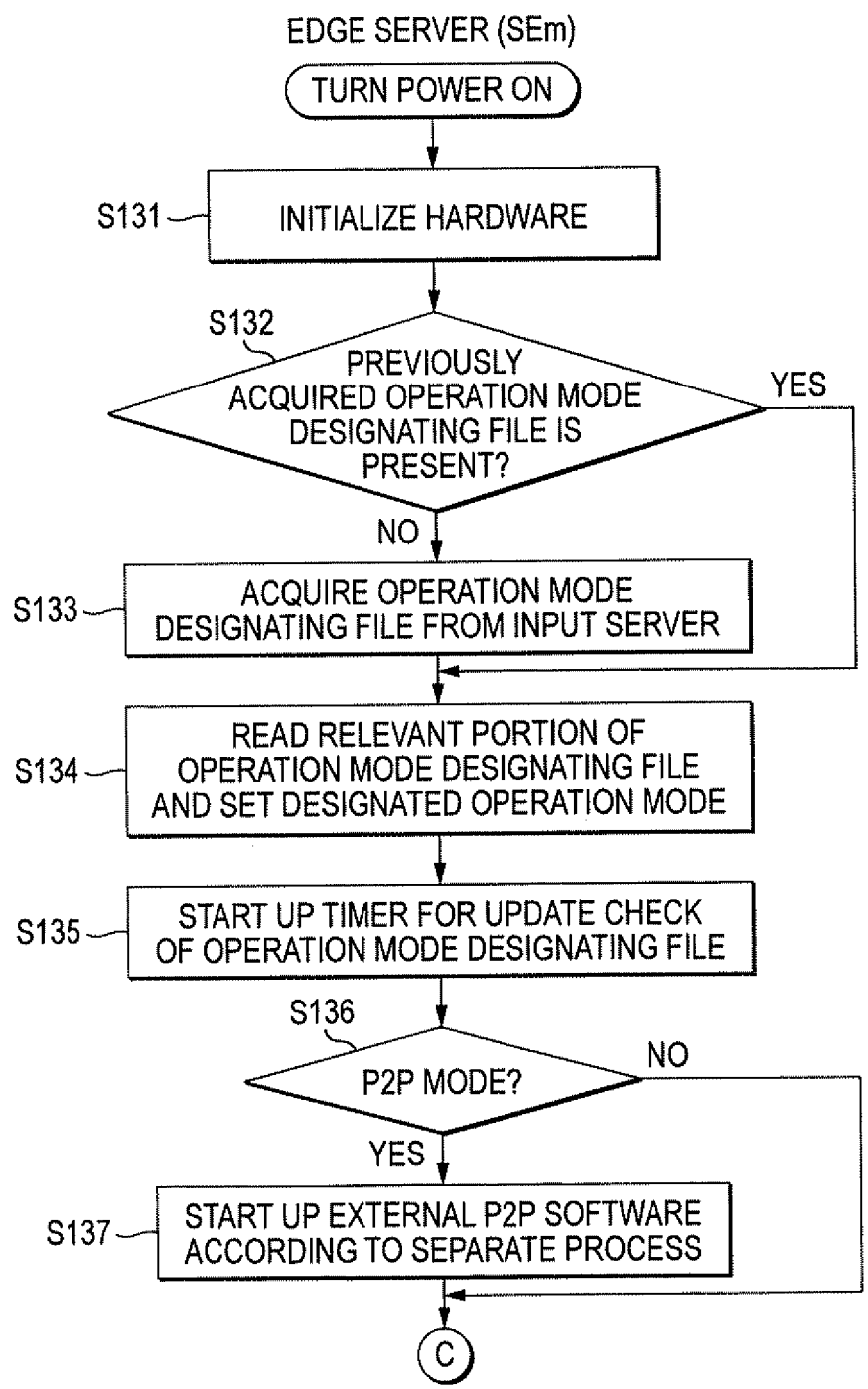
FIGS. 16A and 16B are flow charts each showing an exemplary process of a control unit for the edge server according to the exemplary embodiment.
Figure 16B:
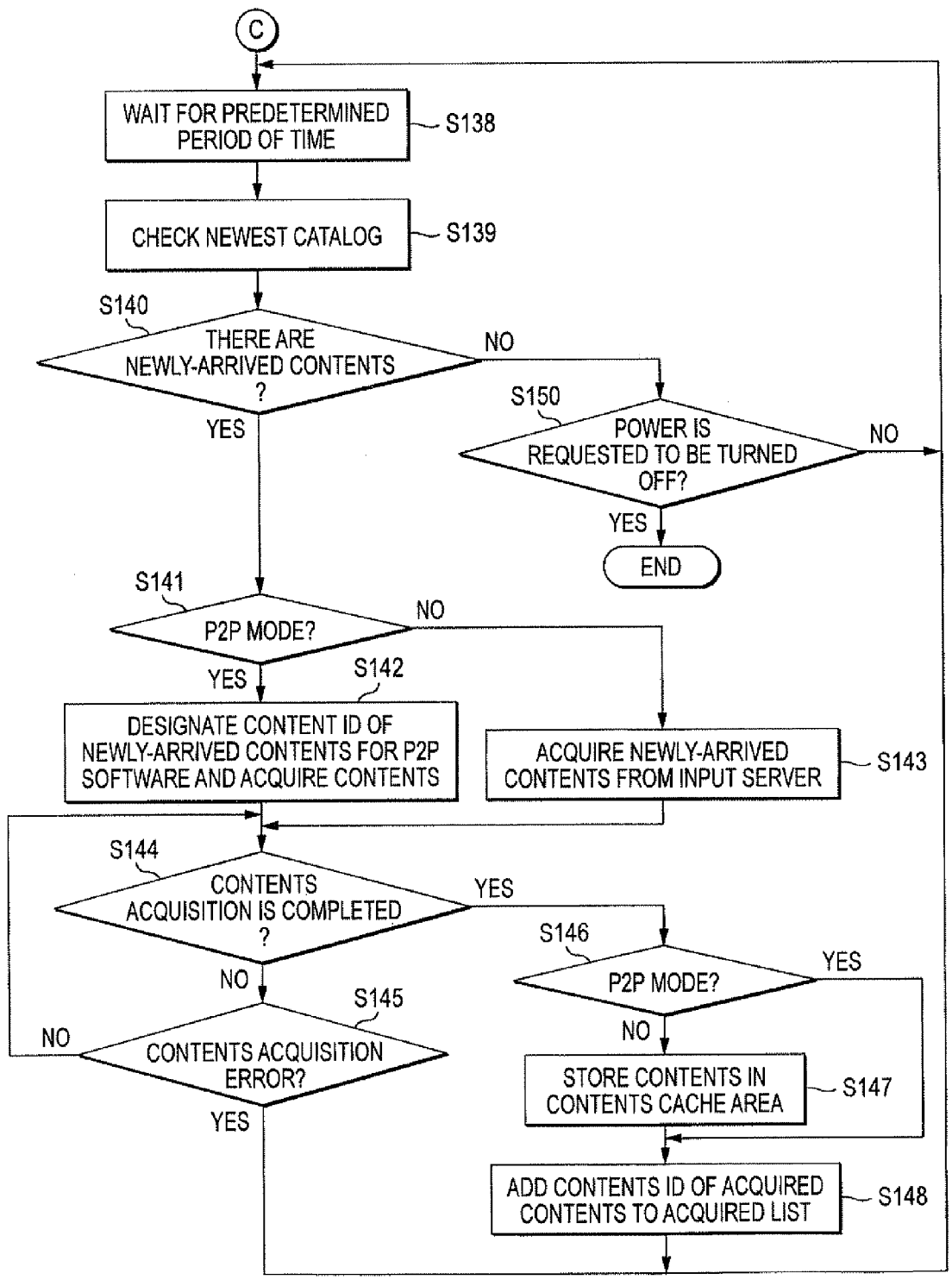

A process of FIGS. 16A and 16B starts when the power of the edge server SEm is turned ON. First, the control unit 21 starts up a proxy program for the edge server and initializes hardware of the edge server SEm (Step S131). Next, the control unit 21 determines whether or not an operation mode designating file is stored in the storage unit 22 (Step S132). If an operation mode designating file is not stored in the storage unit 22 (NO in Step S132), the control unit 21 acquires the newest operation mode designating file from the input server ST (Step S133). Due to the absence of operation mode designating file, the control unit 21 acquires an operation mode designating file in a client-server mode. More specifically, the control unit 21 acquires a contents ID of the newest operation mode designating file from contents catalog information. Then, the control unit 21 transmits a contents request message including the acquired contents ID to the input server ST. Thereafter, the control unit 21 receives the operation mode designating file transmitted from the input server ST. Then, the control unit 21 stores the received operation mode designating file in the storage unit 22.

If an operation mode designating file is stored in the storage unit 22 in Step S132 (YES in Step S132) or when Step S133 is completed, the control unit 21 reads a relevant portion from the operation mode designating file and sets a designated operation mode (Step S134). More specifically, the control unit 21 acquires base identification information of the base m that the edge server SEm itself is a part of from the storage unit 22. Next, the control unit 21 acquires an operation mode of the edge server SEm corresponding to the acquired base identification information from the operation mode designating file. Then, the control unit 21 stores the acquired operation mode in a RAM as a global variable. In addition, if it is determined in Step S132 that an operation mode designating file is stored in the storage unit 22, an operation mode designating file to be read is a previously acquired operation mode designating file. On the other hand, when Step S133 was performed, an operation mode designating file to be read is the operation mode designating file acquired in Step S133.

Next, the control unit 21 starts up a timer for updating of the operation mode designating file (Step S135). When the timer for updating of the operation mode designating file expires, the control unit 21 performs an operation mode control process. The operation mode control process is essentially the same as the operation mode control process of the user terminal Tm-n shown in FIG. 13.

Next, the control unit 21 determines whether or not the operation mode set in Step S134 is a P2P mode (Step S136). If the operation mode is a P2P mode, the control unit 21 starts up the P2P software according to a process other than the contents acquisition program (Step S137). Upon starting up the P2P software, the edge server SEm participates in the P2P network PW.

Upon starting up the P2P software, the control unit 21 performs a P2P software main process. The P2P software main process is essentially the same as the P2P software main process of the user terminal Tm-n shown in FIG. 14. In addition, a contents request process called from the P2P software main process is essentially the same as the contents request process of the user terminal Tm-n shown in FIGS. 15A and 15B. However, for the edge server SEm, an upper level process of the P2P software is the proxy program for edge server.

If the operation mode is a client-server mode in Step S136 (NO in Step S136) or when Step S137 is completed, the control unit 21 waits for a predetermined period of time (Step S138). Next, the control unit 21 checks the content of the newest contents catalog information stored in the storage unit 22 (Step S139). Next, the control unit 21 determines whether or not there are newly-arrived contents (Step S140). For example, the newly-arrived contents are contents whose contents ID is not registered in the acquired list, out of contents whose attribute information is registered in the contents catalog information. If there are no newly-arrived contents (NO in Step S140), the control unit 21 determines whether or not the power is required to be turned OFF by a system administrator (Step S150). If the power is not required to be turned OFF (NO in Step S150), the control unit 21 returns to Step S138.

If there are newly-arrived contents in Step S140 (YES in Step S140), the control unit 21 determines whether or not the current operation mode is a P2P mode (Step S141). If the operation mode is a P2P mode (YES in Step S141), the control unit 21 instructs the P2P software to acquire the newly-arrived contents (Step S142). More specifically, the control unit 21 acquires a contents ID from the attribute information of the newly-arrived contents in the content catalog information. Then, the control unit 21 designates the acquired contents ID for the P2P software and instructs the P2P software to acquire the contents.

If the operation mode is a client-server mode in Step S141 (NO in Step S141), the control unit 21 acquires the newly-arrived contents from the input server ST (Step S143). More specifically, the control unit 21 acquires a contents ID from the attribute information of the newly-arrived contents in the content catalog information. Then, the control unit 21 transmits a contents request message including the acquired contents ID to the input server ST.

After Step S142 or Step S143 is completed, the control unit 21 determines whether or not the contents acquisition is completed (Step S144). If the contents acquisition is not completed (NO in Step S144), the control unit 21 determines whether or not there is a contents acquisition error (Step S145). If there is no contents acquisition error (NO in Step S145), the control unit 21 returns to Step S144.

If the contents acquisition is completed in Step S144 (YES in Step S144), the control unit 21 determines whether or not the current operation mode is a P2P mode (Step S146). If the operation mode is a client-server mode (NO in Step S146), the control unit 21 stores contents acquired from the edge server SEm in the contents cache area (Step S147). If the operation mode is a P2P mode, contents acquired from the P2P network PW are stored in the contents cache area for the P2P software that is being started up according to a separate process.

If the operation mode is a P2P mode in Step S146 (YES in Step S146) or when Step S147 is completed, the control unit 21 registers a contents ID of the acquired newly-arrived contents in the acquired list (Step S148).

If there is a contents acquisition error in Step S145 (YES in Step S145) or when Step S148 is completed, the control unit 21 returns to Step S138.

If the power is required to be turned OFF in Step S150 (YES in Step S150), the control unit 21 ends the process shown in FIGS. 16A and 1613.

In Step S138, if all edge servers SEm have the same waiting time, in some cases, acquisition timings of the newly-arrived contents between the edge servers SEm may overlap with each other. Thus, a load is imposed on the network. In these cases, the control unit 21 may randomly determine the waiting time within a predetermined range of waiting time.

In addition, where there is a newly-arrived contents acquisition error, in some cases, the control unit 21 may attempt to acquire the newly-arrived contents acquisition with the error several times. In these cases, the control unit 21 may exclude contents, which cannot be acquired, even after a lapse of a predetermined period of time, from the newly-arrived contents.

In addition, a contact node of the P2P network PW may be a particular edge server SEm or a particular user terminal Tm-n rather than the input server ST.

In addition, for the above embodiment, the peer-to-peer network using DHT is applied to an overlay network, but the present invention is not limited thereto. For example, a system using a different peer-to-peer system or overlay network may be applied. An example of the peer-to-peer system using no DHT may include a hybrid type peer-to-peer system.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An information communication system for exchanging a plurality of content between a plurality of node devices, the information communication system comprising:
   a plurality of internal networks that is connected to an external network, wherein each of the internal networks comprises:
      node devices connected to the internal network, each of the node devices having a first acquisition unit configured to acquire content by selecting a first device group as a content acquisition destination in preference to a second device group based upon index information, the index information being received from a root node, the first device group including a first support device connecting a first internal network that the node devices are connected to and a first node device connected to the first internal network, the second device group including a second support device connecting a second internal network that is connected to the first internal network via the external network and a second node device connected to the second internal network; and
      a support device, which connects the internal network and the external network, and which supports acquisition of content by the node devices by relaying data between the internal network and the external network; and
   an overlay network, which is a peer-to-peer logical overlay network constructed on a network formed by the external network and the internal networks, the overlay network being configured to allow searching for the index information, and being configured to exchange a specified content among the node devices over the internal networks and the support devices based on the index information, the index information being stored in the root node and including information of a plurality of node devices storing the specified content,
   wherein the node devices and the support devices are coupled to the overlay network, and
   wherein the first acquisition unit of each node device is configured to select the content acquisition destination in a priority order of the first device group, the second support device in the second device group, and the second node device in the second device group.

2. The information communication system according to claim 1,
   wherein the first acquisition unit is configured to select content acquisition destination in a priority order of the first node device in the first device group, the first support device in the first device group, the second support device in the second device group, and the second node device in the second device group.

3. The information communication system according to claim 1, wherein
   the index information includes node information including classification type identifying the node device or the support device and base information identifying a specified internal network among the plurality of the internal networks; and
   the first acquisition unit acquires content preferentially based on the classification information and base information.

4. The information communication system according to claim 1, further comprising:
an input server configured to input content to the overlay network,
wherein the overlay network is configured to exchange the specified content, input by the input server via the overlay network, among the node devices over the internal networks and the support devices based on the index information.

5. The information communication system according to claim 1,
wherein each of the support devices comprises a second acquisition unit that acquires content that satisfies a preset condition from different support devices or different node devices as content that is more likely to be acquired by the node device than content that does not satisfy the preset condition.

6. The information communication system according to claim 5,
wherein each of the node devices comprises a mode acquisition unit that acquires mode information indicating either an overlay network mode or a client-server mode, and
wherein, if the mode information acquired by the mode acquisition unit indicates the client-server mode, the first acquisition unit of the node device acquires content from a predetermined server device via the external network or acquires content from the first support device.

7. The information communication system according to claim 6,
wherein the mode information is a type of content, and
wherein the mode acquisition unit of the node device acquires the mode information from the first acquisition unit.

8. The information communication system according to claim 5,
wherein each of the support devices comprises a mode acquisition unit that acquires mode information indicating either an overlay network mode or a client-server mode, and
wherein, if the mode information acquired by the mode acquisition unit indicates the client-server mode, the second acquisition unit of the support device acquires content from a predetermined server device via the external network.

9. The information communication system according to claim 8,
wherein the mode information is a type of content, and
wherein the mode acquisition unit of the support device acquires the mode information from the different support devices or the different node devices.

10. An information communication method in an information communication system, the method comprising:
exchanging a plurality of content between a plurality of node devices, the information communication system having a plurality of internal networks connected to an external network, each of the plurality of internal networks including:
node devices connected to the internal network, each of the node devices having a first acquisition unit configured to acquire content by selecting a first device group as a content acquisition destination in preference to a second device group based upon index information, the index information being received from a root node, the first device group including a first support device connecting a first internal network that the node devices are connected to and a first node device connected to the first internal network, the second device group including a second support device connecting a second internal network that is connected to the first internal network via the external network and a second node device connected to the second internal network; and
a support device, which connects the internal network and the external network, and which supports acquisition of content by the node devices by relaying data between the internal network and the external network; and
constructing an overlay network, which is a peer-to-peer logical overlay network constructed on a network formed by the external network and the internal networks, the overlay network being configured to allow searching for the index information, and being configured to exchange a specified content among the node devices over the internal networks and the support devices based on the index information, the index information being stored in the root node and including information of a plurality of node devices storing the specified content;
wherein the node devices and the support devices are coupled to the overlay network, and
wherein the first acquisition unit of each node device is configured to select the content acquisition destination in a priority order of the first device group, the second support device in the second device group, and the second node device in the second device group.

11. The information communication method according to claim 10, wherein
the index information includes node information including classification type identifying the node device or the support device and base information identifying a specified internal network among the plurality of the internal networks; and
the first acquisition unit acquires content preferentially based on the classification information and base information.

12. The information communication method according to claim 10,
wherein each of the support devices comprises a second acquiring unit acquiring content that satisfies a preset condition from different support devices or different node devices as content that is more likely to be acquired by the node device than content which does not satisfy the preset condition.

13. The information communication method according to claim 12,
wherein each of the node devices comprises a first mode acquiring unit acquiring mode information indicating either an overlay network mode or a client-server mode,
wherein, in the first acquiring unit, the node device acquires content from a predetermined server device via the external network or acquires content from the first support device if the mode information corresponding to the node device that acquires content from the second support device or the second node device indicates the client-server mode.

14. The information communication method according to claim 12,
wherein each of the support devices comprises a second mode acquiring unit acquiring mode information indicating either an overlay network mode or a client-server mode,
wherein each of the support devices further comprises a third acquiring unit acquiring content from a predetermined server device via the external network if the mode information corresponding to the support device that acquires content indicates the client-server mode, and wherein the second acquiring unit is included in the third acquiring unit.

15. A non-transitory computer-readable medium having an information communication program stored thereon and readable by a computer in an information communication system in which a plurality of content is exchanged between a plurality of node devices, the information communication program, when executed by the computer, causes the computer to perform operations comprising:

acquiring content by selecting a first device group as a content acquisition destination in preference to a second device group based upon index information, the first device group including a first support device connecting a first internal network that the computer is connected to and a first node device connected to the first internal network, and the second device group including a second support device connecting a second internal network via the external network and a second node device connected to the second internal network, wherein:

the information communication system comprises a plurality of internal networks connected to an external network, each of the plurality of internal networks includes node devices connected thereto and a support device which connects the internal network and the external network and supports acquisition of content by the node devices by relaying data between the internal network and the external network, an overlay network, which is a peer-to-peer logical overlay network constructed on a network formed by the external network and the internal networks, the overlay network being configured to allow searching for the index information, and being configured to exchange a specified content among the node devices over the internal networks and the support devices based on the index information, the index information being stored in the root node and including information of a plurality of node devices storing the specified content.

16. The non-transitory computer-readable medium according to claim 15, wherein the index information includes node information including classification type identifying the node device or the support device and base information identifying a specified internal network among the plurality of the internal networks; and the first acquisition unit acquires content preferentially based on the classification information and base information.

17. The non-transitory computer-readable medium according to claim 15, wherein the first acquisition unit is configured to select content acquisition destination in a priority order of the first node device in the first device group, the first support device in the first device group, the second support device in the second device group, and the second node device in the second device group.

* * * * *